(12) United States Patent
Ramakrishnan et al.

(10) Patent No.: US 8,078,884 B2
(45) Date of Patent: Dec. 13, 2011

(54) METHOD OF AND SYSTEM FOR SELECTING AND PRESENTING CONTENT BASED ON USER IDENTIFICATION

(75) Inventors: Kajamalai G. Ramakrishnan, Nashua, NH (US); Satyanarayanan Ramaswamy, Windham, NH (US)

(73) Assignee: Veveo, Inc., Andover, MA (US)

( * ) Notice: Subject to any disclaimer, the term of this patent is extended or adjusted under 35 U.S.C. 154(b) by 1003 days.

(21) Appl. No.: 11/939,086

(22) Filed: Nov. 13, 2007

(65) Prior Publication Data
US 2008/0209229 A1    Aug. 28, 2008

Related U.S. Application Data

(60) Provisional application No. 60/865,481, filed on Nov. 13, 2006.

(51) Int. Cl.
*G06F 21/00*    (2006.01)

(52) U.S. Cl. .......................................... 713/186; 726/16

(58) Field of Classification Search .................. 707/731, 707/767
See application file for complete search history.

(56) References Cited

U.S. PATENT DOCUMENTS

| | | | |
|---|---|---|---|
| 1,261,167 A | 4/1918 | Russell | |
| 4,045,777 A | 8/1977 | Mierzwinski et al. | |
| 4,453,217 A | 6/1984 | Boivie | |
| 4,760,528 A | 7/1988 | Levin | |
| 4,797,855 A | 1/1989 | Duncan, IV et al. | |
| 4,893,238 A | 1/1990 | Venema | |
| 5,224,060 A | 6/1993 | Ma et al. | |
| 5,337,347 A | 8/1994 | Halstead-Nussloch et al. | |
| 5,369,605 A | 11/1994 | Parks | |
| 5,487,616 A | 1/1996 | Ichbiah | |
| 5,532,754 A | 7/1996 | Young et al. | |
| 5,557,686 A | 9/1996 | Brown et al. | |

(Continued)

FOREIGN PATENT DOCUMENTS

EP    181058    5/1986

(Continued)

OTHER PUBLICATIONS

International Search Report and Written Opinion of the International Searching Authority, the United States Patent and Trademark Office for PCT/US2007/084500, dated May 20, 2008, 7 pages.

(Continued)

*Primary Examiner* — Matthew Smithers
(74) *Attorney, Agent, or Firm* — Wilmer Cutler Pickering Hale & Dorr LLP.

(57) ABSTRACT

Methods of and systems for selecting and presenting content based on user identification are provided. A user-interface method of selecting and presenting content items in which the presentation is ordered at least in part based on inferring which user of a collection of users is using an input device includes providing a set of content items, providing a set of preference information for each user indicating content item preferences of a corresponding user, and providing a set of user keypress biometric models representing expected keypress activity for the corresponding user. User keypress activity to identify desired content items is monitored to biometrically characterize the user and analyzed to find the closest match to one of the keypress biometric models. Based on the closest match, which user of the collection of users entered the input is inferred and the corresponding preference information is used to select, order, and present content items.

32 Claims, 9 Drawing Sheets

U.S. PATENT DOCUMENTS

| | | | |
|---|---|---|---|
| 5,623,406 A | 4/1997 | Ichbiah | |
| 5,635,989 A | 6/1997 | Rothmuller | |
| 5,745,889 A | 4/1998 | Burrows | |
| 5,774,588 A | 6/1998 | Li | |
| 5,802,361 A | 9/1998 | Wang et al. | |
| 5,805,155 A | 9/1998 | Allibhoy et al. | |
| 5,818,437 A | 10/1998 | Grover et al. | |
| 5,828,420 A | 10/1998 | Marshall et al. | |
| 5,828,991 A | 10/1998 | Skiena et al. | |
| 5,835,087 A | 11/1998 | Herz et al. | |
| 5,859,662 A | 1/1999 | Cragun et al. | |
| 5,872,834 A * | 2/1999 | Teitelbaum | 379/93.03 |
| 5,880,768 A | 3/1999 | Lemmons et al. | |
| 5,896,444 A | 4/1999 | Perlman et al. | |
| 5,912,664 A | 6/1999 | Eick et al. | |
| 5,930,788 A | 7/1999 | Wical | |
| 5,937,422 A | 8/1999 | Nelson et al. | |
| 5,945,928 A | 8/1999 | Kushler et al. | |
| 5,945,987 A | 8/1999 | Dunn | |
| 5,953,541 A | 9/1999 | King et al. | |
| 6,005,565 A | 12/1999 | Legall et al. | |
| 6,005,597 A | 12/1999 | Barrett et al. | |
| 6,006,225 A | 12/1999 | Bowman et al. | |
| 6,008,799 A | 12/1999 | Van Kleeck | |
| 6,009,459 A | 12/1999 | Belfiore et al. | |
| 6,011,554 A | 1/2000 | King et al. | |
| 6,041,311 A | 3/2000 | Chislenko et al. | |
| 6,047,300 A | 4/2000 | Walfish et al. | |
| 6,075,526 A | 6/2000 | Rothmuller | |
| 6,133,909 A | 10/2000 | Schein et al. | |
| 6,169,984 B1 | 1/2001 | Bogdan | |
| 6,184,877 B1 | 2/2001 | Dodson et al. | |
| 6,189,002 B1 | 2/2001 | Roitblat | |
| 6,204,848 B1 | 3/2001 | Nowlan et al. | |
| 6,223,059 B1 | 4/2001 | Haestrup | |
| 6,260,050 B1 | 7/2001 | Yost et al. | |
| 6,266,048 B1 | 7/2001 | Carau, Sr. | |
| 6,266,814 B1 | 7/2001 | Lemmons et al. | |
| 6,269,361 B1 | 7/2001 | Davis et al. | |
| 6,286,064 B1 | 9/2001 | King et al. | |
| 6,292,804 B1 | 9/2001 | Ardoin et al. | |
| 6,307,548 B1 | 10/2001 | Flinchem et al. | |
| 6,307,549 B1 | 10/2001 | King et al. | |
| 6,360,215 B1 | 3/2002 | Judd et al. | |
| 6,377,945 B1 | 4/2002 | Risvik | |
| 6,383,080 B1 | 5/2002 | Link et al. | |
| 6,385,602 B1 | 5/2002 | Tso et al. | |
| 6,392,640 B1 | 5/2002 | Will | |
| 6,438,579 B1 | 8/2002 | Hosken et al. | |
| 6,438,751 B1 | 8/2002 | Voyticky et al. | |
| 6,463,586 B1 | 10/2002 | Jerding | |
| 6,466,933 B1 | 10/2002 | Huang et al. | |
| 6,529,903 B2 | 3/2003 | Smith | |
| 6,543,052 B1 | 4/2003 | Ogasawara | |
| 6,564,213 B1 | 5/2003 | Ortega et al. | |
| 6,564,313 B1 | 5/2003 | Kashyap | |
| 6,594,657 B1 | 7/2003 | Livowsky et al. | |
| 6,600,496 B1 | 7/2003 | Wagner et al. | |
| 6,614,422 B1 | 9/2003 | Rafii et al. | |
| 6,614,455 B1 | 9/2003 | Cuijpers et al. | |
| 6,615,248 B1 | 9/2003 | Smith | |
| 6,622,148 B1 | 9/2003 | Noble et al. | |
| 6,631,496 B1 | 10/2003 | Li et al. | |
| 6,662,177 B1 | 12/2003 | Martino et al. | |
| 6,664,980 B2 | 12/2003 | Bryan et al. | |
| 6,708,336 B1 | 3/2004 | Bruette | |
| 6,721,954 B1 | 4/2004 | Nickum | |
| 6,732,369 B1 | 5/2004 | Schein et al. | |
| 6,734,881 B1 | 5/2004 | Will | |
| 6,735,695 B1 * | 5/2004 | Gopalakrishnan et al. | 713/186 |
| 6,757,906 B1 | 6/2004 | Look et al. | |
| 6,766,526 B1 | 7/2004 | Ellis | |
| 6,772,147 B2 | 8/2004 | Wang | |
| 6,785,671 B1 | 8/2004 | Bailey et al. | |
| 6,801,909 B2 | 10/2004 | Delgado et al. | |
| 6,835,602 B2 | 12/2004 | Norskov et al. | |
| 6,839,702 B1 | 1/2005 | Patel et al. | |
| 6,839,705 B1 | 1/2005 | Grooters | |
| 6,850,693 B2 | 2/2005 | Young et al. | |
| 6,865,575 B1 | 3/2005 | Smith | |
| 6,865,746 B1 | 3/2005 | Herrington et al. | |
| 6,907,273 B1 | 6/2005 | Smethers | |
| 6,965,374 B2 | 11/2005 | Villet et al. | |
| 6,999,959 B1 | 2/2006 | Lawrence et al. | |
| 7,013,304 B1 | 3/2006 | Schuetze et al. | |
| 7,117,207 B1 | 10/2006 | Kerschberg et al. | |
| 7,130,866 B2 | 10/2006 | Schaffer | |
| 7,136,845 B2 | 11/2006 | Chandrasekar et al. | |
| 7,136,854 B2 | 11/2006 | Smith et al. | |
| 7,146,627 B1 | 12/2006 | Ismail et al. | |
| 7,149,983 B1 | 12/2006 | Robertson et al. | |
| 7,191,238 B2 * | 3/2007 | Uchida | 709/229 |
| 7,213,256 B1 | 5/2007 | Kikinis | |
| 7,225,180 B2 | 5/2007 | Donaldson et al. | |
| 7,225,184 B2 | 5/2007 | Carrasco et al. | |
| 7,225,455 B2 | 5/2007 | Bennington et al. | |
| 7,269,548 B2 | 9/2007 | Fux et al. | |
| 7,293,231 B1 | 11/2007 | Gunn et al. | |
| 7,461,061 B2 | 12/2008 | Aravamudan et al. | |
| 7,487,151 B2 | 2/2009 | Yamamoto et al. | |
| 7,509,313 B2 | 3/2009 | Colledge et al. | |
| 7,529,741 B2 | 5/2009 | Aravamudan et al. | |
| 7,529,744 B1 | 5/2009 | Srivastava et al. | |
| 7,536,384 B2 | 5/2009 | Venkataraman et al. | |
| 7,536,854 B2 | 5/2009 | Da-Silva et al. | |
| 7,539,676 B2 | 5/2009 | Aravamudan et al. | |
| 7,548,915 B2 | 6/2009 | Ramer et al. | |
| 7,594,244 B2 | 9/2009 | Scholl et al. | |
| 7,644,054 B2 | 1/2010 | Garg et al. | |
| 7,657,526 B2 | 2/2010 | Aravamudan et al. | |
| 7,679,534 B2 | 3/2010 | Kay et al. | |
| 7,683,886 B2 | 3/2010 | Willey | |
| 7,685,197 B2 | 3/2010 | Fain et al. | |
| 7,712,053 B2 | 5/2010 | Bradford et al. | |
| 7,725,485 B1 | 5/2010 | Sahami et al. | |
| 7,725,486 B2 | 5/2010 | Tsuzuki et al. | |
| 7,739,280 B2 | 6/2010 | Aravamudan et al. | |
| 7,757,250 B1 | 7/2010 | Horvitz et al. | |
| 7,774,294 B2 | 8/2010 | Aravamudan et al. | |
| 7,774,341 B2 | 8/2010 | Aravamudan et al. | |
| 7,779,011 B2 | 8/2010 | Venkataraman et al. | |
| 7,788,266 B2 | 8/2010 | Venkataraman et al. | |
| 7,792,815 B2 | 9/2010 | Aravamudan et al. | |
| 7,835,998 B2 | 11/2010 | Aravamudan et al. | |
| 2001/0044759 A1 | 11/2001 | Kutsumi et al. | |
| 2002/0002550 A1 | 1/2002 | Berman | |
| 2002/0042791 A1 | 4/2002 | Smith et al. | |
| 2002/0049752 A1 | 4/2002 | Bowman et al. | |
| 2002/0052873 A1 | 5/2002 | Delgado et al. | |
| 2002/0059066 A1 | 5/2002 | O'Hagan | |
| 2002/0059621 A1 | 5/2002 | Thomas et al. | |
| 2002/0077143 A1 | 6/2002 | Sharif et al. | |
| 2002/0083448 A1 | 6/2002 | Johnson | |
| 2002/0116291 A1 | 8/2002 | Grasso et al. | |
| 2002/0120925 A1 | 8/2002 | Logan | |
| 2002/0133481 A1 | 9/2002 | Smith et al. | |
| 2002/0144267 A1 | 10/2002 | Gutta et al. | |
| 2002/0152190 A1 | 10/2002 | Biebesheimer et al. | |
| 2002/0184373 A1 | 12/2002 | Maes | |
| 2002/0188488 A1 | 12/2002 | Hinkle | |
| 2002/0199194 A1 | 12/2002 | Ali | |
| 2003/0005452 A1 | 1/2003 | Rodriguez | |
| 2003/0005462 A1 | 1/2003 | Broadus et al. | |
| 2003/0011573 A1 | 1/2003 | Villet et al. | |
| 2003/0014753 A1 | 1/2003 | Beach et al. | |
| 2003/0023976 A1 | 1/2003 | Kamen et al. | |
| 2003/0033292 A1 | 2/2003 | Meisel et al. | |
| 2003/0037043 A1 | 2/2003 | Chang et al. | |
| 2003/0037333 A1 | 2/2003 | Ghashghai et al. | |
| 2003/0046698 A1 | 3/2003 | Kamen et al. | |
| 2003/0051240 A1 | 3/2003 | Schaffer et al. | |
| 2003/0066068 A1 | 4/2003 | Gutta et al. | |
| 2003/0066079 A1 | 4/2003 | Suga | |
| 2003/0067495 A1 | 4/2003 | Pu et al. | |
| 2003/0084270 A1 | 5/2003 | Coon et al. | |
| 2003/0097661 A1 | 5/2003 | Li et al. | |
| 2003/0103088 A1 | 6/2003 | Dresti et al. | |

| | | |
|---|---|---|
| 2003/0135464 A1 | 7/2003 | Mourad et al. |
| 2003/0154138 A1* | 8/2003 | Phillips et al. .................. 705/26 |
| 2003/0217121 A1 | 11/2003 | Willis |
| 2003/0226146 A1 | 12/2003 | Thurston et al. |
| 2003/0229900 A1 | 12/2003 | Reisman |
| 2003/0237096 A1 | 12/2003 | Barrett et al. |
| 2004/0021691 A1 | 2/2004 | Dostie et al. |
| 2004/0024777 A1 | 2/2004 | Schaffer |
| 2004/0034652 A1 | 2/2004 | Hofmann et al. |
| 2004/0046744 A1 | 3/2004 | Rafii et al. |
| 2004/0049783 A1 | 3/2004 | Lemmons et al. |
| 2004/0054520 A1 | 3/2004 | Dehlinger et al. |
| 2004/0073432 A1 | 4/2004 | Stone |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0111745 A1 | 6/2004 | Schein et al. |
| 2004/0128686 A1 | 7/2004 | Boyer et al. |
| 2004/0139091 A1 | 7/2004 | Shin |
| 2004/0143569 A1 | 7/2004 | Gross et al. |
| 2004/0155908 A1 | 8/2004 | Wagner |
| 2004/0163032 A1 | 8/2004 | Guo et al. |
| 2004/0194141 A1 | 9/2004 | Sanders |
| 2004/0205065 A1 | 10/2004 | Petras et al. |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0254911 A1 | 12/2004 | Grasso et al. |
| 2004/0261021 A1 | 12/2004 | Mittal et al. |
| 2005/0015366 A1 | 1/2005 | Carrasco et al. |
| 2005/0038702 A1 | 2/2005 | Merriman et al. |
| 2005/0071874 A1 | 3/2005 | Elcock et al. |
| 2005/0079895 A1 | 4/2005 | Kalenius et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0125307 A1 | 6/2005 | Hunt et al. |
| 2005/0129199 A1 | 6/2005 | Abe |
| 2005/0174333 A1 | 8/2005 | Robinson et al. |
| 2005/0187945 A1* | 8/2005 | Ehrich et al. .................. 707/100 |
| 2005/0192944 A1 | 9/2005 | Flinchem |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0246324 A1 | 11/2005 | Paalasmaa et al. |
| 2005/0267994 A1 | 12/2005 | Wong et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0010503 A1 | 1/2006 | Inoue et al. |
| 2006/0013487 A1 | 1/2006 | Longe et al. |
| 2006/0015906 A1 | 1/2006 | Boyer et al. |
| 2006/0020662 A1 | 1/2006 | Robinson |
| 2006/0036640 A1 | 2/2006 | Tateno et al. |
| 2006/0041843 A1 | 2/2006 | Billsus et al. |
| 2006/0044277 A1 | 3/2006 | Fux et al. |
| 2006/0059044 A1 | 3/2006 | Chan et al. |
| 2006/0069616 A1 | 3/2006 | Bau |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0090812 A1 | 5/2006 | Summerville |
| 2006/0098899 A1 | 5/2006 | King et al. |
| 2006/0101499 A1 | 5/2006 | Aravamudan et al. |
| 2006/0101503 A1 | 5/2006 | Venkataraman |
| 2006/0101504 A1 | 5/2006 | Aravamudan et al. |
| 2006/0106782 A1 | 5/2006 | Blumenau et al. |
| 2006/0112162 A1 | 5/2006 | Marot et al. |
| 2006/0117019 A1 | 6/2006 | Sylthe et al. |
| 2006/0136379 A1 | 6/2006 | Marino et al. |
| 2006/0156233 A1 | 7/2006 | Nurmi |
| 2006/0161520 A1 | 7/2006 | Brewer et al. |
| 2006/0163337 A1 | 7/2006 | Unruh |
| 2006/0167676 A1 | 7/2006 | Plumb |
| 2006/0167859 A1 | 7/2006 | Verbeck Sibley et al. |
| 2006/0173818 A1 | 8/2006 | Berstis et al. |
| 2006/0176283 A1 | 8/2006 | Suraqui |
| 2006/0184989 A1 | 8/2006 | Slothouber |
| 2006/0190308 A1 | 8/2006 | Janssens et al. |
| 2006/0195435 A1 | 8/2006 | Laird-McConnell et al. |
| 2006/0206454 A1 | 9/2006 | Forstall et al. |
| 2006/0206815 A1 | 9/2006 | Pathiyal et al. |
| 2006/0242178 A1 | 10/2006 | Butterfield et al. |
| 2006/0242607 A1 | 10/2006 | Hudson |
| 2006/0248078 A1 | 11/2006 | Gross et al. |
| 2006/0256070 A1 | 11/2006 | Moosavi et al. |
| 2006/0256078 A1 | 11/2006 | Flinchem et al. |
| 2006/0259344 A1 | 11/2006 | Patel et al. |
| 2006/0259479 A1 | 11/2006 | Dai |
| 2006/0261021 A1 | 11/2006 | Stagnaro |
| 2006/0271552 A1 | 11/2006 | McChesney et al. |
| 2006/0274051 A1 | 12/2006 | Longe et al. |
| 2006/0282856 A1 | 12/2006 | Errico et al. |
| 2007/0005526 A1 | 1/2007 | Whitney et al. |
| 2007/0005563 A1 | 1/2007 | Aravamudan |
| 2007/0005576 A1 | 1/2007 | Cutrell et al. |
| 2007/0016476 A1 | 1/2007 | Hoffberg et al. |
| 2007/0016862 A1 | 1/2007 | Kuzmin |
| 2007/0027852 A1 | 2/2007 | Howard et al. |
| 2007/0027861 A1 | 2/2007 | Huentelman et al. |
| 2007/0027871 A1 | 2/2007 | Arbajian |
| 2007/0043750 A1 | 2/2007 | Dingle |
| 2007/0044122 A1 | 2/2007 | Scholl et al. |
| 2007/0050337 A1 | 3/2007 | Venkataraman et al. |
| 2007/0050348 A1 | 3/2007 | Aharoni et al. |
| 2007/0061244 A1 | 3/2007 | Ramer et al. |
| 2007/0061317 A1 | 3/2007 | Ramer et al. |
| 2007/0061321 A1 | 3/2007 | Venkataraman |
| 2007/0061753 A1 | 3/2007 | Ng et al. |
| 2007/0061754 A1 | 3/2007 | Ardhanari et al. |
| 2007/0067272 A1 | 3/2007 | Flynt et al. |
| 2007/0074131 A1 | 3/2007 | Assadollahi |
| 2007/0088681 A1 | 4/2007 | Aravamudan et al. |
| 2007/0094024 A1 | 4/2007 | Kristensson et al. |
| 2007/0100650 A1 | 5/2007 | Ramer et al. |
| 2007/0130128 A1 | 6/2007 | Garg et al. |
| 2007/0143567 A1 | 6/2007 | Gorobets |
| 2007/0150606 A1 | 6/2007 | Flinchem et al. |
| 2007/0182595 A1 | 8/2007 | Ghasabian |
| 2007/0208718 A1 | 9/2007 | Javid et al. |
| 2007/0219984 A1 | 9/2007 | Aravamudan et al. |
| 2007/0219985 A1 | 9/2007 | Aravamudan et al. |
| 2007/0226649 A1 | 9/2007 | Agmon |
| 2007/0240045 A1 | 10/2007 | Fux et al. |
| 2007/0242178 A1 | 10/2007 | Kawasaki et al. |
| 2007/0255693 A1 | 11/2007 | Ramaswamy et al. |
| 2007/0256070 A1 | 11/2007 | Bykov et al. |
| 2007/0260703 A1 | 11/2007 | Ardhanari et al. |
| 2007/0266021 A1 | 11/2007 | Aravamudan et al. |
| 2007/0266026 A1 | 11/2007 | Aravamudan et al. |
| 2007/0266406 A1 | 11/2007 | Aravamudan et al. |
| 2007/0271205 A1 | 11/2007 | Aravamudan et al. |
| 2007/0276773 A1 | 11/2007 | Aravamudan et al. |
| 2007/0276821 A1 | 11/2007 | Aravamudan et al. |
| 2007/0276859 A1 | 11/2007 | Aravamudan et al. |
| 2007/0288456 A1 | 12/2007 | Aravamudan et al. |
| 2007/0288457 A1 | 12/2007 | Aravamudan et al. |
| 2008/0065617 A1 | 3/2008 | Burke et al. |
| 2008/0077577 A1 | 3/2008 | Byrne et al. |
| 2008/0109401 A1 | 5/2008 | Sareen et al. |
| 2008/0177717 A1 | 7/2008 | Kumar et al. |
| 2008/0195601 A1 | 8/2008 | Ntoulas et al. |
| 2008/0209229 A1 | 8/2008 | Ramakrishnan et al. |
| 2008/0313564 A1 | 12/2008 | Barve et al. |
| 2009/0077496 A1 | 3/2009 | Aravamudan et al. |
| 2009/0198688 A1 | 8/2009 | Venkataraman et al. |
| 2009/0217203 A1 | 8/2009 | Aravamudan et al. |
| 2010/0121845 A1 | 5/2010 | Aravamudan et al. |
| 2010/0153380 A1 | 6/2010 | Garg et al. |
| 2010/0241625 A1 | 9/2010 | Aravamudan et al. |
| 2010/0293160 A1 | 11/2010 | Aravamudan et al. |
| 2010/0325111 A1 | 12/2010 | Aravamudan et al. |

FOREIGN PATENT DOCUMENTS

| | | |
|---|---|---|
| EP | 1050794 A | 11/2000 |
| EP | 1143691 | 10/2001 |
| EP | 1338967 | 8/2003 |
| EP | 1458193 | 9/2004 |
| EP | 1463307 A2 | 9/2004 |
| EP | 1622054 | 2/2006 |
| EP | 1810120 | 7/2007 |
| EP | 1955130 | 8/2008 |
| EP | 2016513 | 1/2009 |
| EP | 2062171 | 5/2009 |
| JP | 2009534761 | 9/2009 |
| JP | 2010-503931 | 2/2010 |
| WO | WO-9856173 | 12/1998 |
| WO | WO-0070505 | 11/2000 |
| WO | WO-2004010326 | 1/2004 |
| WO | WO-2004/031931 A1 | 4/2004 |
| WO | WO-2005/033967 A3 | 4/2005 |
| WO | WO-2005054982 A2 | 6/2005 |
| WO | WO-2005/084235 A2 | 9/2005 |
| WO | WO-2005084235 | 9/2005 |
| WO | WO-2006052959 | 5/2006 |
| WO | WO-2006052966 | 5/2006 |
| WO | WO-2007025148 | 3/2007 |
| WO | WO-2007025149 | 3/2007 |
| WO | WO-2007062035 | 5/2007 |
| WO | WO-2007118038 | 10/2007 |
| WO | WO-2007/124429 | 11/2007 |
| WO | WO-2007/124436 A2 | 11/2007 |
| WO | WO-2007131058 | 11/2007 |
| WO | WO-2008034057 | 3/2008 |
| WO | WO-2008091941 | 7/2008 |
| WO | WO-2008063987 | 8/2008 |
| WO | WO-2008148012 | 12/2008 |

OTHER PUBLICATIONS

International Search Report and Written Opinion of the International Searching Authority, the United States Patent and Trademark Office, for PCT/US2007/067114, dated Jul. 2, 2008, 4 pages.
Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251>.
Supplemental European Search Report for EP 07761026.9 dated Jan. 28, 2010, 8 pages.
Turski, et al., "Inner Circle—People Centered Email Client," CHI 2005 Conference on Human Factors in Computing Systems, Apr. 2005, pp. 1845-1848, 4 pages, retrieved from URL:http://portal.acm.org/citation.cfm?id+1056808.1057037.
International Search Report, International Patent Application No. PCT/US07/84500, mailed May 20, 2008 (2 pages).
Villani, M. et al. "Keystroke Biometric Recognition Studies on Long-Text Input Under Ideal and Application-Oriented Conditions [online]". Proceedings of Student/Faculty Research Day, CSIS, Pace University, May 5, 2006. (pp. C3.1-C3.8).
U.S. Appl. No. 60/548,589, filed Sep. 1, 2005, Flinchem.
U.S. Appl. No. 11/855,661, Venkataraman et al.
U.S. Appl. No. 11/862,917, Aravamudan.
U.S. Appl. No. 12/018,566, Venkataraman et al.
Ardissono, L. et al., User Modeling and Recommendation Techniques for Personalized Electronic Program Guides, Personalized Digital Television, Editors: Ardissono, et al., Kluwer Academic Press, 2004.
Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml.
Digital Video Broadcasting, http://www.dvb.org (Oct. 12, 2007).
Gadd, Phonix: The Algorith, Program, vol. 24(4), Oct. 1990 (pp. 363-369).
Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.
International Search Report, International Application No. PCT/US06/25249, mailed Jan. 29, 2008 (2 pages).
International Search Report, International Application No. PCT/US06/33204, mailed Sep. 21, 2007 (2 pages).
International Search Report, International Application No. PCT/US06/40005, mailed Jul. 3, 2007 (4 Pages).
International Search Report, International Application No. PCT/US07/65703, mailed Jan. 25, 2008 (2 pages).
International Search Report, International Application No. PCT/US07/67100, mailed Mar. 7, 2008 (2 pages).
MacKenzie et al., LetterWise: Prefix-based disambiguation for mobile text input, Proceedings of the ACM Symposium on User Interface Software and Technology—UIST2001, pp. 111-120.
Matthom, "Text Highlighting in Search Results", Jul. 22, 2005. Available at www.matthom.com/archive/2005/07/22/text-highlighting-in-search-results; retrieved Jun. 23, 2006. (4 pages).
Mokotoff, Soundexing and Genealogy, Available at http://www.avotaynu.com/soundex.html, retrieved Mar. 19, 2008, last updated Sep. 8, 2007 (6 pages).
Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242.
Review of Personalization Technologies: Collaborative Filtering vs. ChoiceStream's Attributized Bayesian Choice Modeling, Technology Brief, ChoiceStream Technologies, Cambridge, MA.
Silfverberg et al., Predicting text entry speed on mobile phones, Proceedings of the ACM Conference on Human Factors in Computing System—Chi, 2000. pp. 1-16.
Talbot, David. "Soul of a New Mobile Machine." *Technology Review: The Design Issue* May/Jun. 2007. (pp. 46-53).
Wikipedia's entry for Levenshtein distance (n.d.). Retrieved Nov. 15, 2006 from http://en.wikipedia.org/wiki/Levenshtein_distance.
Written Opinion of the International Searching Authority, International Application No. PCT/US06/25249, mailed Jan. 29, 2008 (4 pages).
Written Opinion of the International Searching Authority, International Application No. PCT/US06/33204, mailed Sep. 21, 2007 (3 pages).
Written Opinion of the International Searching Authority, International Application No. PCT/US06/40005, mailed Jul. 3, 2007 (4 pages).
Written Opinion of the International Searching Authority, International Application No. PCT/US07/65703, mailed Jan. 25, 2008 (4 pages).
Written Opinion of the International Searching Authority, International Application No. PCT/US07/67100, mailed Mar. 7, 2008 (3 pages).
Kurapati, et al., "Multi-Agent TV Recommender," In Proceedings of UM 2001 Workshop, "Personalization in Future TV," 2001, 8 pages.
Murray, et al., "Inferring Demographic Attributes of Anonymous Internet Users," WEBKDD'99, LNAI, 1836, pp. 7-20, 2000.
Zimmerman, et al., "TV Personalization Systme Design of a TV Show Recommender Engine and Interface," in Liliana Ardissono, Alfred Kosba, Mark Mabury (eds) Personalized Digital Television: Targeting Programs to Individual Viewers, Kluwer: 2004, 27-52, 29 pages.
Review of Personalization Technologies: Collaborative Filtering vs. ChoiceStream's Attributized Bayesian Choice Modeling, Technology Brief, ChoiceStream Technologies, Cambridge, MA. (13 pages, date unavailable)
Supplemental European Search Report for EP 05826114.0 dated Aug. 20, 2009, 13 pages.
Supplemental European Search Report for EP05826129.8 dated Aug. 11, 2009, 15 pages.
Supplemental European Search Report for EP06838179.7 dated Dec. 9, 2009, 7 pages.
International Search Report and Written Opinion of the International Searching Authority of the United States Patent and Trademark Office for PCT/US2005/040415, dated Nov. 27, 2006, 6 pages.
International Search Report and Written Opinion of the International Searching Authority of the United States Patent and Trademark Office for PCT/US2006/033257, dated Mar. 26, 2008, 6 pages.

International Search Report and Written Opinion of the International Searching Authority of the United States Patent and Trademark Office for PCT/US2006/045053, dated Jul. 24, 2008, 10 pages.

International Search Report and Written Opinion of the International Searching Authority of the United States Patent and Trademark Office for PCT/US2006/33258, dated Mar. 26, 2008, 6 pages.

International Search Report and Written Opinion of the International Searching Authority of the United States Patent and Trademark Office for PCT/US2007/078490 dated Jul. 3, 2008, 6 pages.

International Search Report and Written Opinion of the International Searching Authority of the United States Patent and Trademark Office for PCT/US2008/051789, dated Jul. 14, 2008, 7 pages.

International Search Report and Written Opinion of the International Searching Authority of the United States Patent and Trademark Office for PCT/US2008/064730, dated Sep. 8, 2008, 5 pages.

International Search Report and Written Opinion, International Patent Application No. PCT/US07/67114, mailed 2 Jul. 2008 (6 pages).

Murray et al., "Inferring Demographic Attributes of Anonymous Internet Users," WEBKDD '99 LNAI, 1836, pp. 7-20, 2000.

Roe, et al., "Mapping UML Models Incorporating OCL Constraints into Object-Z," Technical Report, Sep. 2003, Department of Computing, Imperial College London, retrieved on Jul. 12, 2007, retrieved from the internet: <URL: http://www.doc.ic.ac.uk/-ar3/TechnicalReport2003_9.pdf>, 17 pages.

Supplementary European Search Report and Written Opinion for EP07842499, dated Aug. 25, 2010, 6 pages.

Supplementary European Search Report for EP07761026.9 dated Jan. 28, 2010, 8 pages.

Zimmerman, et al., "TV Personalization System Design of a TV Show Recommender Engine and Interface," In Liliana Ardissono, Alfred Kobsa, Mark Maybury (eds) Personalized Digital Television: Targeting Programs to Individual Viewers, Kluwer: 27-52; 2004, 29 pages.

Supplementary European Search Report for PCT/US2005040424, dated Aug. 20, 2009, 13 pages.

Supplementary European Search Report for PCT/US2005040415, dated Aug. 11, 2009, 15 pages.

International Search Report and Written Opinion of the International Searching Authority of the United States Patent and Trademark Office for PCT/US2007/068064, dated Jul. 7, 2008, 9 pages.

International Search Report and Written Opinion of the International Searching Authority for PCT/US05/040517 dated Jun. 13, 2008, 4 pages.

Office Action for U.S. Appl. No. 11/204,546 mailed Sep. 17, 2009, 34 pages.

Office Action for U.S. Appl. No. 11/204,546 mailed Mar. 3, 2009, 26 pages.

Office Action for U.S. Appl. No. 11/204,546 mailed Jul. 8, 2008, 30 pages.

International Search Report and Written Opinion of the International Searching Authority, the United States Patent and Trademark Office, for PCT/US2005/40424, mailing date of Nov. 21, 2006, 6 pages.

* cited by examiner

METHOD OF AND SYSTEM FOR SELECTING AND PRESENTING CONTENT BASED ON USER IDENTIFICATION

CROSS-REFERENCE TO RELATED APPLICATIONS

This application claims the benefit under 35 U.S.C. §119 (e) of the following application, the contents of which are incorporated by reference herein:

U.S. Provisional Application No. 60/865,481, entitled Keystroke Biometrics Using Chi-Square Statistics, filed Nov. 13, 2006.

BACKGROUND OF THE INVENTION

1. Field of Invention

This invention relates generally to personalizing a user's interaction with content query systems and, more specifically, to inferring which user of a collection of users is the current user of an electronic device based on biometric data about the current user's keystrokes.

2. Description of Related Art

Methods of and systems for performing searches for content items are presented in U.S. Patent Application Publication No. US 2006/0101503, published May 11, 2006, entitled Method and System For Performing Searches For Television Content Items Using Reduced Text Input. As described in that application, a user can enter a reduced text search entry directed at identifying desired content items (e.g., television shows, movies, music, etc.). The system identifies a group of one or more content items having descriptors matching the search entry. The results can be ordered based on a relevance function that can be a domain specific combination of, for example, popularity, temporal relevance, location relevance, personal preferences, and the number of words in the input search string.

Methods of and systems for ranking the relevance of the members of a set of search results are presented in U.S. Patent Application Publication No. US 2007/0005563, published Jan. 4, 2007, entitled Method And System For Incremental Search With Reduced Text Entry Where The Relevance Of Results Is A Dynamically Computed Function Of User Input Search String Character Count. As described in that application, a user can enter a reduced text entry for finding content items across multiple search spaces. Based on the number of characters of the reduced text entry, the results from one search space are selectively boosted over results from a different search space.

Methods of and system for selecting and presenting content based on user preference information extracted from an aggregate preference signature are presented in U.S. patent application Ser. No. 11/682,695, filed Mar. 6, 2007, entitled Methods and Systems for Selecting and Presenting Content Based on User Preference Information Extracted From an Aggregate Preference Signature. As described in that application, a system discovers and tracks aggregate content preferences of a group of users based on content selections made through a common interface device. The content preferences of the individual users of the group are inferred from the aggregate content preferences using techniques described in that application. Once the individual content preferences are determined, the method enables a system to infer which user of the group is manipulating the common interface device at a later time by observing the content selections of the current user and finding the closest matching set of individual content item preferences. Upon inferring which user of the group is using the device, the system can then employ the content item preferences to enhance the user experience by promoting the relevance of content items that match the inferred user's preferences.

Several different methods of identifying users of a device on the basis of typing speed have been proposed. In short, prior art statistical classification systems apply first-order techniques and Gaussian likelihood estimations, followed by one or more geometric techniques. Also, non-statistical, combinatorial techniques are employed in validating the test sample. Clarke et al. present a non-statistical method in which typing speeds are collected on a fixed set of keys, and a neural network is used to classify the vector of typing speeds (N. L. Clarke, S. M. Furnell, B. M. Lines, and P. L. Reynolds, *Keystroke Dynamics on a Mobile Handset: A Feasibility Study*, Information Management & Computer Security, Vol. 11, No. 4, 2003, pp. 161-166, incorporated by reference herein). This is an example of a fixed text system, because it requires the user to enter a fixed set of keys during system initialization (D. Gunetti and C. Picardi, *Keystroke Analysis of Free Text*, ACM Transactions on Information and System Security, Vol. 8, No. 3, August 2005, pp. 312-347, incorporated by reference herein). Fixed text approaches are of limited utility, however, because it is often inconvenient for a user to enter a lengthy sequence of keys during this initialization phase. Most of the other work based on non-statistical techniques is described by Gunetti and Picardi, who conducted a comprehensive study on keystroke biometrics of free text on full-function keyboards.

Statistical techniques used for classification are presented by Joyce and Gupta and Monrose and Rubin (R. Joyce and G. Gupta, *Identity Authentication Based on Keystroke Latencies*, Communications of the ACM, Vol. 33, No. 2, February 1990, pp. 168-176; F. Monrose and A. D. Rubin, *Keystroke Dynamics as a Biometric for Authentication*, Future Generation Computer Systems Vol. 16, 2000, pp. 351-359, both incorporated by reference herein). Both of these studies use first-order techniques followed by geometric comparisons. Joyce and Gupta compute the mean and standard deviation of the reference sample, and, if the test sample is less than 0.5 standard deviations from the mean, it is considered to be valid. Additionally, this method treats the test sample of latencies as a vector in n-dimensions, and compares it to the reference vector by computing the L1-norm of the difference vector. If the L1-norm is small enough, the test sample is considered to be valid.

Monrose and Rubin perform similar vector comparisons, but use the Euclidean norm instead of L1-norm. They also compute the mean and standard deviation of the reference sample, which is assumed to be a Gaussian distribution. Given a reference sample with a mean $\mu$ and standard deviation $\sigma$, the probability of obtaining the observation value X is given by:

$$Prob[X] = \frac{1}{\sigma\sqrt{2\pi}} e^{\frac{-(X-\mu)^2}{2\sigma^2}} \quad \text{(Equation 1)}$$

The probabilities are then summed over various features of the sample to obtain a "score" for each reference, and the reference sample achieving the maximum score is selected. In a variation of this approach, the weighted sum of probabilities is used. In both cases, the statistical technique used is (1) Fitting a single Gaussian to the reference sample and (2) Summing the resulting probabilities.

Monrose and Rubin also propose a more sophisticated Bayesian classifier, in which, using the terminology of Gunetti and Picardi, n-graphs are used to cluster the reference samples into features and a feature vector is formed for both the reference samples and the test sample. A likelihood probability is then computed based on the presumption that each feature is a Gaussian distribution. This technique is similar to the prior technique in the sense that it relies upon first-order statistical characteristics of the data.

BRIEF SUMMARY OF THE INVENTION

The invention provides methods of and systems for selecting and presenting content based on user identification.

Under one aspect of the invention, a user-interface method of selecting and presenting a collection of content items in which the presentation is ordered at least in part based on inferring which user of a relatively small collection of users is using an input device includes providing a set of content items, providing a set of preference information for each user of the collection of users, each set of preference information indicating content item preferences of a corresponding user, and providing a set of user keypress biometric models, each model representing expected keypress activity for the corresponding user. The method also includes receiving incremental input entered by a user for incrementally identifying desired content items. The incremental input corresponds to a sequence of keys pressed by the user on the input device. In response to the incremental input entered by the user, the method calls for monitoring and characterizing keypress activity to biometrically characterize the user. The method further includes analyzing the keypress activity to find the closest match to one of the keypress biometric models. The method uses the closest match to infer which user of the collection of users entered the incremental input and selects preference information corresponding to the inferred user. In response to selecting the preference information and the incremental input entered by the user, the method calls for selecting and presenting a collection of content items in an order that portrays as relatively more relevant those content items that more closely match the set of preferences of the inferred user.

Under another aspect of the invention, each user keypress biometric model at least represents an expected delay between key presses for ordered keypress pairs for the corresponding user. The monitoring and characterizing keypress activity includes determining the amount of time between successive key presses and associating times between key presses and the corresponding ordered keypress pairs. The analyzing the keypress activity includes analyzing the determined times and associated ordered keypress pairs to find the closest match to one of the keypress biometric models.

Under a further aspect of the invention, the ordered keypress pairs include a plurality of unique pairings of keys of the input device.

Under yet another aspect of the invention, the expected delay between key presses for ordered keypress pairs is represented by a set of expected delays for each keypress pair. The expected delay between key presses for ordered keypress pairs can be represented by at least one discrete range.

Under an aspect of the invention, the analyzing the keypress activity to find the closest match includes at least one of a first-order statistical comparison of the keypress activity and the set of user keypress biometric models and a second-order statistical comparison of the keypress activity and the set of user keypress biometric models. The analyzing the keypress activity to find the closest match can include a Chi-Square statistical comparison of the keypress activity and the set of user keypress biometric models.

Under a further aspect of the invention, the incremental input includes ambiguous text.

Under still further aspects of the invention, the input device is at least one of an input-constrained and a device-constrained device. The input device can be at least one of a television remote control system, a telephone, a PDA, and a handheld personal computing device.

Under another aspect of the invention, the content items include at least one of audio/video content, address book information, electronic documents, and a collection of words.

Under yet another aspect of the invention, each user keypress biometric model at least represents an expected amount of time that a key is depressed for the corresponding user. The monitoring and characterizing keypress activity includes determining the amount of time a key is depressed and associating the times and the corresponding keys. The analyzing the keypress activity includes analyzing the determined times and associated keys to find the closest match to one of the keypress biometric models.

Under a further aspect of the invention, the input device includes more than one input mode controlling how incremental input is entered and each user keypress biometric model at least represents a preferred input mode for the corresponding user. The monitoring and characterizing keypress activity includes determining the input mode selected by the user. The analyzing the keypress activity includes analyzing the input mode selected by the user to find the closest match to one of the keypress biometric models.

Under another aspect of the invention, each user keypress biometric model at least represents an expected amount of pressure applied to a key when depressed for the corresponding user. The monitoring and characterizing keypress activity includes determining the amount of pressure applied to a key when depressed and associating the pressures and the corresponding keys. The analyzing the keypress activity includes analyzing the determined pressures and associated keys to find the closest match to one of the keypress biometric models.

Under a further aspect of the invention, the input device includes a plurality of function keys controlling how content items are presented and each user keypress biometric model at least represents preferred function keys for the corresponding user. The monitoring and characterizing keypress activity includes determining the function keys pressed by the user. The analyzing the keypress activity includes analyzing the determined function keys pressed to find the closest match to one of the keypress biometric models.

Under other aspects of the invention, a user-interface system for selecting and presenting a collection of content items in which the presentation is ordered at least in part based on inferring which user of a relatively small collection of users is using an input device is provided. Such systems are capable of performing the methods set forth above.

BRIEF DESCRIPTION OF THE SEVERAL VIEWS OF THE DRAWINGS

For a more complete understanding of various embodiments of the present invention, reference is now made to the following descriptions taken in connection with the accompanying drawings, in which.

DETAILED DESCRIPTION

Preferred embodiments of the invention infer which one of a collection of a relatively small number of users is the current user of an electronic device by collecting data about the timing of the current user's keystrokes and comparing these data against a database of users using a combination of first- and second-order statistical techniques. In an illustrative example, the small number of users are members of a household using a single interface device (e.g. a remote-control for a television). When a member of the household uses the device, the timing of the user's keystrokes is collected and compared to the stored biometric signatures of all household members by (i) encoding the signatures using linear combinations of Gaussian functions; and then (ii) attempting to match the current user to one of the users of the small set by using a combination of first- and second-order techniques. If the current user is successfully identified as a particular member of the household, the device can then select a user profile corresponding to the inferred identity. The profile includes preferences information and thus may influence subsequent user interaction. For example, incremental entries by the user may be interpreted differently as a result of preference information. The user need not explicitly "log in" to selection a corresponding profile.

Figure 1:
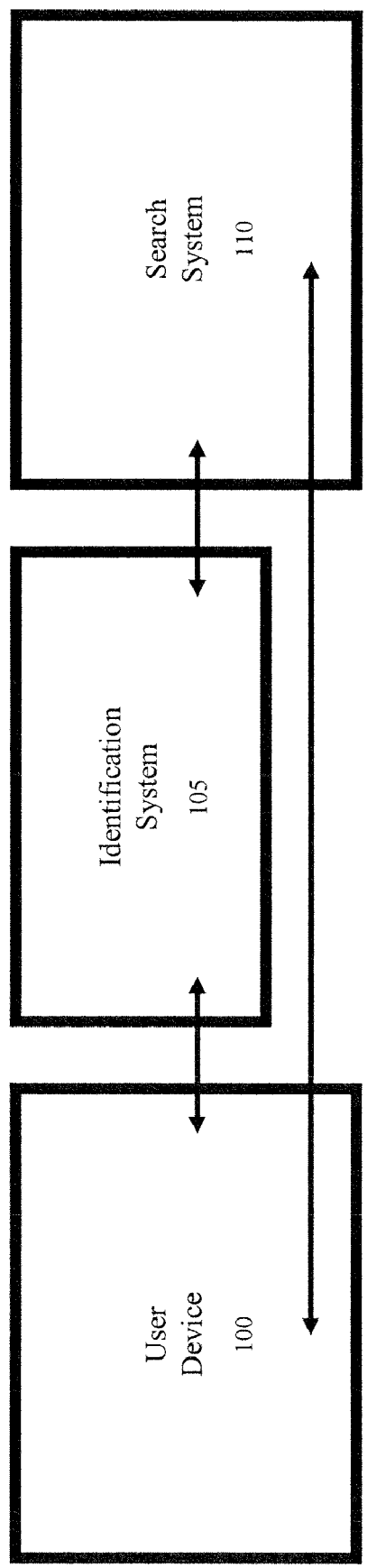
FIG. 1 illustrates a system for presenting search results.

FIG. 1 is a system diagram, depicting a biometric identification search system to provide personalized search results. The system includes a user device 100 that cooperates with identification logic 105 and search logic 110. The user device 100 enables the user to interact with both the identification logic 105 and the search logic 110. Note that the identification logic 105 and the search logic 110 can be included in the user device 100, or can be separate from the user device 100 (e.g., on a remote server in communication with a client device). For example, the user device 100 could be a television remote control coupled with television content system. Alternatively, the user device 100 could be a handheld computer device, such as a PDA.

The search logic 110 includes a catalog of content items. For illustrative purposes, content items discussed herein are audio/video content items, such as television programs, movies, web clips, etc. However, content items can include other information. For example, content items can include address book entries, electronic documents, individual words, and/or other types of information. Based on text queries supplied by the user, the search logic 110 finds content items most likely of interest to the user by matching the user's input with information associated with the content items. For example, the search logic 110 may be a collection of movies with associated metadata (e.g., movie character names, actor names, plot items, etc.).

As the user enters input on the user device 100, the identification logic 105 records the timing of the user's keystrokes associated with ordered pairs of the specific keys depressed. This information is used infer the identity of the user among a collection of users, as described in greater detail below. After the user is identified using the identification logic 105, the searches performed using the search logic 110 can be influenced by the preferences of the identified user. In applying the identified user's preferences, the search logic 110 can communicate directly with the identification logic 105, or alternatively, the search logic might obtain the identity of the current user from the user device 100 itself, which in turn communicates with the identification logic.

If the user device 100 is a television remote-control system, for example, the device might store each user's viewing preferences along with the user's biometric keystroke information. If user A most often watches news programs, and the current user is identified as user A, then subsequent interpretation of queries will apply more weight to search results for news programs and they will be displayed prominently when the user searches for available television programs. If, on the other hand, the current user is identified as user B, who watches mostly cartoon programs, then the search logic will give more weight to search results for cartoon programs and move those results to the top of the current user's search results.

Embodiments of the present invention build on techniques, systems, and methods disclosed in earlier filed applications, including, but not limited to U.S. patent application Ser. No. 11/136,261, filed on May 24, 2005, entitled Method and System For Performing Searches For Television Content Items Using Reduced Text Input, U.S. patent application Ser. No. 11/204,546, filed on Aug. 15, 2005, entitled A Non-Intrusive Television Interface to Search With Reduced Text Entry For Instant Content Availability and Rendering Desired Content, U.S. patent application Ser. No. 11/246,432, filed on Oct. 7, 2005, entitled Method and System For Incremental Search With Reduced Text Entry Where the Relevance of Results Is a Dynamically Computed Function of User Input Search String Character Count, U.S. patent application Ser. No. 11/312,908, filed on Dec. 20, 2005, entitled Method And System For Dynamically Processing Ambiguous, Reduced Text Search Queries And Highlighting Results Thereof, U.S. patent application Ser. No. 11/509,909, filed Aug. 25, 2006, entitled User Interface For Visual Cooperation Between Text Input and Display Device, U.S. patent application Ser. No. 11/235,928, filed on Sep. 27, 2005, entitled Method and System For Processing Ambiguous, Multiterm Search Queries, U.S. patent application Ser. No. 11/682,693, filed on Mar. 6, 2007, entitled Methods and Systems For Selecting and Presenting Content Based On Learned Periodicity Of User Content Selections, U.S. patent application Ser. No. 11/682,588, filed Mar. 6, 2007, entitled Methods and Systems For Selecting and Presenting Content On A First System Based on User Preferences Learned On a Second System, U.S. patent application Ser. No. 11/855,661, filed Sep. 14, 2007, entitled Methods And Systems For Dynamically Rearranging Search Results Into Hierarchically Organized Concept Clusters, and U.S. patent application Ser. No. 11/682,695, filed Mar. 6, 2007, entitled Methods and Systems for Selecting and Presenting Content Based on User Preference Information Extracted From an Aggregate Preference Signature; the contents of all of the above-listed applications are incorporated by reference herein. These applications teach specific ways to perform incremental searches using ambiguous text input and methods of ordering search results. In addition, these applications teach methods to employ personal user preferences to discover relevant content and to order such content.

For example, the application entitled Methods and Systems for Selecting and Presenting Content Based on User Preference Information Extracted From an Aggregate Preference Signature, incorporated above, describes techniques for discovering and tracking aggregate content preferences of a group of users based on content selections made through a common interface device. The content preferences of the individual users of the group are inferred from the aggregate content preferences using various methods described in that application. As described in that application, once the individual content preferences are determined, the method enables a system to infer which user of the group is manipulating the common interface device at a later time by observing the content selections of the current user and finding the closest matching set of individual content item preferences. Upon inferring which user of the group is using the device, the system can then employ the content item preferences to enhance the user experience by promoting the relevance of content items that match the inferred user's preferences.

In another example, the application entitled Methods and Systems For Selecting and Presenting Content Based On Learned Periodicity Of User Content Selections, incorporated above, describes techniques for discovering and tracking content preferences based on determining the periodicity of recurring content selection patterns. The methods disclosed in that application call for employing different content item preferences based on comparing the time and day a later search query is entered to the learned patterns of content item selections. For example, content items relating to international news may be promoted as more relevant during the early mornings, while cartoons may be promoted as more relevant during the early afternoons. Thus, by allowing for different content item preferences to be applied during different time periods, the techniques in that application enable the preferences of multiple users to be tracked and differentiated to some degree.

The present techniques, however, are not limited to the systems and methods disclosed in the incorporated patent applications. Thus, while reference to such systems and applications may be helpful, it is not believed necessary for the purpose of understanding the present embodiments or inventions. In addition, while the present techniques can be used in combination with the systems and methods incorporated above, the present techniques can infer which set of user preferences to employ independent of a particular time period and without requiring the current user of the device to make a content selection. Instead, the techniques described herein enable the device or system to infer which set of content item preference to use based on the manner in which the user manipulated the keys of the input device.

Framework of the Selection System

Notation

Hereinafter the following generic notation is used: Letters and lowercase Greek symbols in normal font will denote scalars. Letters and Greek symbols in bold font will denote column vectors of appropriate dimension (for example, s). An element of a vector will be indicated by a subscript following the vector symbol (for example, $s_j$). Uppercase Greek symbols will denote sets (for example, $\Delta$). Vertical bars around a set symbol will denote the cardinality of the set (for example, $|\Delta|$ will denote the number of elements in the set $\Delta$). If the set is ordered, then the $k^{th}$ element will be denoted by an index k enclosed in parentheses following the set symbol (for example, $\Delta(k)$).

Keyboards and Input Methods

The synthesis and identification procedures described in this document can apply generally to several different varieties of keyboards and keypads. In particular, many portable or input- and/or display-constrained devices require the use of overloaded keys. A single overloaded key is used for several different functions. For example, when using a telephone keypad to type text, the "5" key usually corresponds to the number 5 as well as the letters j, k, and l. The system can allow the user to explicitly differentiate between these several distinct functions, or it can automatically determine which function to select based on context (for example, if the user presses the "5" key when entering a telephone number, the system might assume that the user intended to type the number 5, and not the letters j, k, or l). Further discussion of input- and/or display-constrained devices is included in the incorporated applications.

In the context of text-entry using a keypad having overloaded keys, several operating modes may be available to the user. For example, one mode requires the user to differentiate between the characters associated with an overloaded key by pressing the key multiple times (triple-tap or "T-tap" mode). Another mode applies the multiple tap technique, but reorders the associated characters according to frequency of use ("V-let" mode). Yet another mode allows for a keypress to represent any of the characters associated with the overloaded key ("V-tap" mode). Different users have a natural bias towards one of these modes, and this preference itself can serve as a biometric identifier. If each family member prefers a different mode, then the identification problem is solved. The following is predicated on the assumption that there are at least two family members that prefer the same mode, necessitating further analysis for identification.

The biometric identification system described below is driven by keypresses. Thus, although reference may be made to characters, it is understood that the intent is that the character corresponds to a keypress. Therefore, identification will function appropriately for devices with or without overloaded keyboards, and in all three overloaded operating modes above.

Observation Sample, Supersample, Biometric Signature, and Ensemble

The framework of the model is based on the premise that the typing speed of a given user varies according to the particular pair of successive keys being pressed. For example, the elapsed time between pressing "1" and "9" on a standard telephone keypad would probably be larger than the typing speeds between "1" and "2", because the distance between the "1" key and the "9" key is greater than the distance between "1" and "2". Also, for a given pair of keys, different family members will type at different speeds, based on neuromuscular biology and cognitive abilities. The following terminology is designed to capture the notion that an observation of typing speed can be classified on the basis of a particular pair of keys:

A key set, $\Gamma$, is a representation of a set of keys on a keypad. In the discussion below, $\Gamma$ will be the set $\{0, 1, 2, 3, 4, 5, 6, 7, 8, 9, \#, *\}$, corresponding to the keys of a telephone keypad. However, the methods disclosed are equally applicable to a keypad or keyboard with an arbitrary number of keys.

An observation, Y, is the elapsed time between typing a pair of keys; this is the fundamental data point for the biometrics. A sample, $\Delta_{ij}$, is an ordered set of observations corresponding to a given pair of keys i and j:

$$\Delta_{ij} = \{Y = \text{elapsed time successive keys i and j}; i \in \Gamma, j \in \Gamma\}$$

Because $\Delta_{ij}$ is an ordered set, one can view it as a vector of observations Y, where the $k^{th}$ observation in the sample is denoted by $Y_{ij,k}$.

A supersample, denoted by the symbol $\Theta$, is a set of samples, where each sample contains observations for a given pair.

$$\Theta = \{\Delta_{ij} | i \in \Gamma, j \in \Gamma\}$$

Using the telephone-keypad key set containing twelve keys as defined above, a complete supersample will be comprised of 144 samples. In general, the number of samples in a complete supersample will be equal to $|\Gamma|^2$.

A biometric signature, denoted by the symbol $\Lambda$, is a compact representation of $\Theta$, formed using the Gaussian Basis function approach discussed below. Under this approach, a Gaussian basis comprising $K_{ij}$ Gaussian functions is generated for each sample $\Delta_{ij}$ in the supersample $\Theta$, and is denoted by the 3-tuple $(\mu_{ij}, \sigma_{ij}, K_{ij})$; here, $\mu_{ij}$ and $\sigma_{ij}$ are vectors of size $K_{ij}$:

$$\Lambda = \{(\mu_{ij}, \sigma_{ij}, K_{ij}) | i \in \Gamma, j \in \Gamma\}$$

An ensemble is a set of users. During identification, the current supersample is compared against each of the users in the ensemble to determine its authenticity. A member of the ensemble will be denoted by a superscript r in the appropriate set symbol; for example $\Delta_{ij}^{(r)}$, $\Theta^{(r)}$, and $\Lambda^{(r)}$ will denote the sample, supersample, and biometric signature for the $r^{th}$ user. The symbol $\Re$ will denote the set of users in the ensemble. Specifically, where L represents the number of users in the ensemble:

$$\Re = \{(\Theta^{(r)}, \Lambda^{(r)}), 1 \leq r \leq L\}$$

Figure 2:
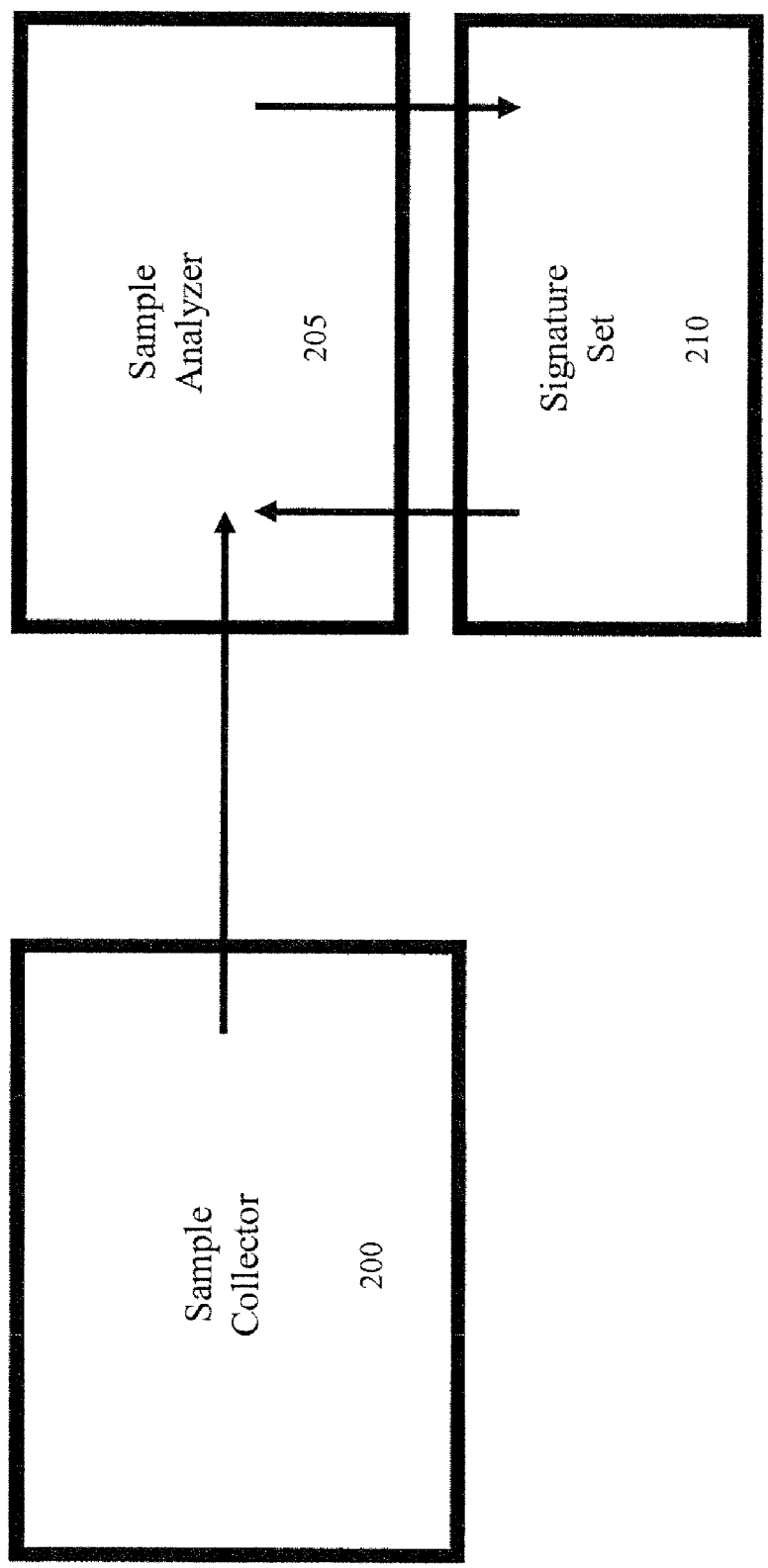
FIG. 2 illustrates an overview of a biometric identification system.

FIG. 2 shows the various components of the identification system. The Sample Collector 200 collects keypresses and timestamps and communicates this information to the Sample Analyzer 205. The Sample Analyzer then compares this information to the information contained in the Signature Set 210 in order to infer the identity of the current user of the device.

Figure 3:
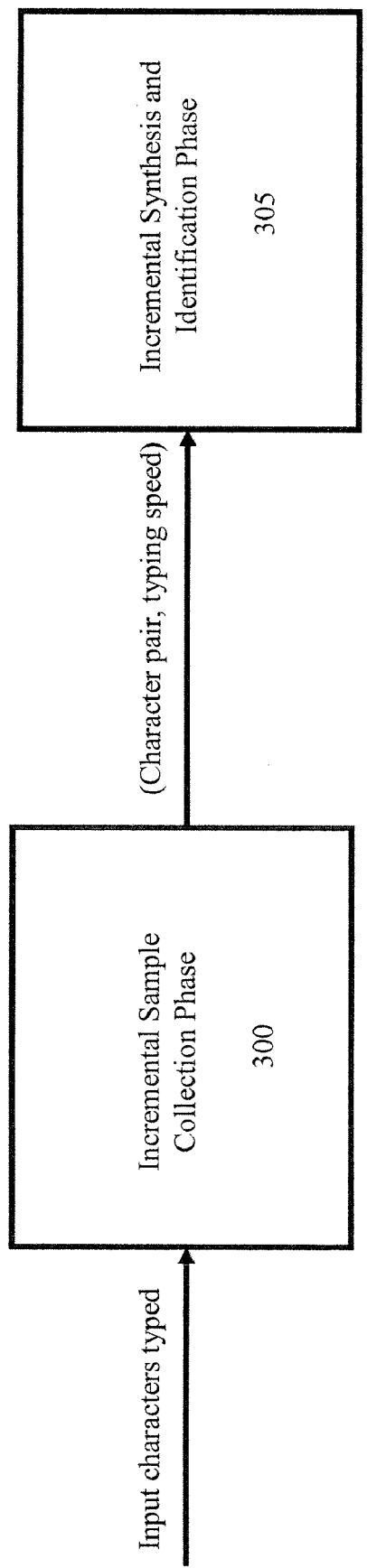
FIG. 3 illustrates the operation of a biometric identification system.

FIG. 3 depicts the two phases of the biometric identification system: the sample collection phase 300, and the analysis, synthesis, and identification phase 305. Every key that is pressed is processed by both phases in an incremental manner. The sample collection phase 300 is modeled as a finite state machine that is in perpetual operation. The model operates in two states: active and silent. When the machine is in the active state, the user is pressing keys; when in the silent state, the user is engaged in other activities.

Finite State Machine Model of Incremental Sample Collection

Figure 4:
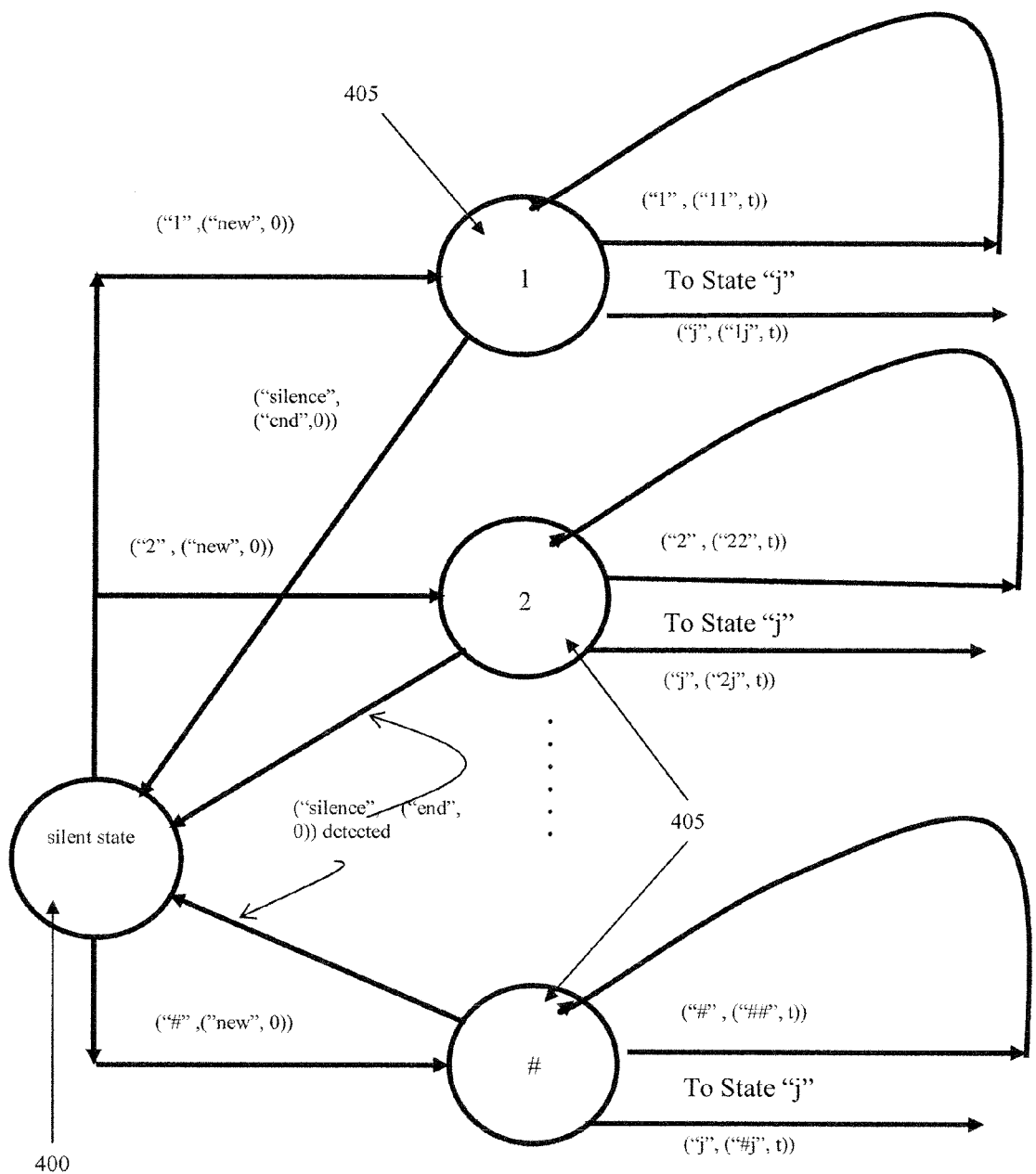
FIG. 4 illustrates a finite state machine for biometric synthesis and identification.

FIG. 4 shows a finite-state machine diagram of the process of incremental sample collection. At any given time, a finite-state machine is in one of a fixed set of states, shown in FIG. 4 as circles 400, 405. The machine can shift from one state to another depending on the input it receives; these transitions are known as edges, and are represented as arrows. Both entry and exit edges of the state are time stamped, and the difference between the two times represents the typing speed.

In one illustrative implementation, the input device is a twelve-key telephone keypad. The state machine corresponding to such a device has 13 states: 12 key states 405 and a silent state 400. Each key state 405 is labeled according to the last key that was pressed by the user. Whenever a new key is pressed, the machine enters a new state. If the new key is the same as the last key, the new state is the same as the old state. The output sent to the synthesis phase 305 (in FIG. 3) contains the elapsed time t between typing a first key i and a second key j (here, i and j are variables that represent arbitrary keys in the key set). At any given time, the system is in one of these states; when the user is in non-query generation mode, the system waits in the silent state 400. When the first key is pressed, the machine transits to one of the key states 405 and signals the start of a new sample. The finite state machine transits between key states 405 for every new key pressed, until the user stops pressing keys for a specified amount of time, at which time the system transits to the silent state 400 after emitting the output ("end", 0).

For example, suppose a user of the keypad were to type the test key-sequence "1233." The first "1" would move the machine from the silent state to the 1-state, and the current time would be recorded. The "2" would move the machine into the 2-state, again causing the time to be recorded. After the first "3", the machine would be in the 3-state, and the machine would remain in this state after the second "3", although these two keypresses are regarded as separate and the timestamps of both are recorded. After the second "3" is pressed, the machine detects "silence" and returns to the silent state. The output of the entire process (i.e. the timestamps, the keys pressed, etc.) is sent to the synthesis and identification phase for processing.

Synthesis and Identification Phase

As discussed above, the biometric identification process requires a collection of supersamples representing users of the relatively small set (the ensemble $\Re$), which is used to infer the identity of the current user. The process of statistically encoding these supersamples, called synthesis, can be performed on the fly as part of the identification phase. Here, this approach is adopted; the synthesis phase and the identification phase are combined. If the current supersample is not statistically matched to any of the existing supersamples, then a synthesis of Gaussian basis functions is performed on the new supersample as described below, and the biometric signature is added to the ensemble.

Procedure BIOMETRIC_IDENTIFICATION provides an illustrative algorithm for biometric identification. The procedure uses a function ACCEPT($\Theta$, $\Re$), described in detail below, that returns the index of the user that matches the supersample $\Theta$, or the value 0 if no match is found. In addition, the function outputs a confidence metric corresponding to the statistical probability that the identified user is, in fact, the current user; this confidence metric is calculated using second-order statistical techniques, described in more detail below.

Figure 8:
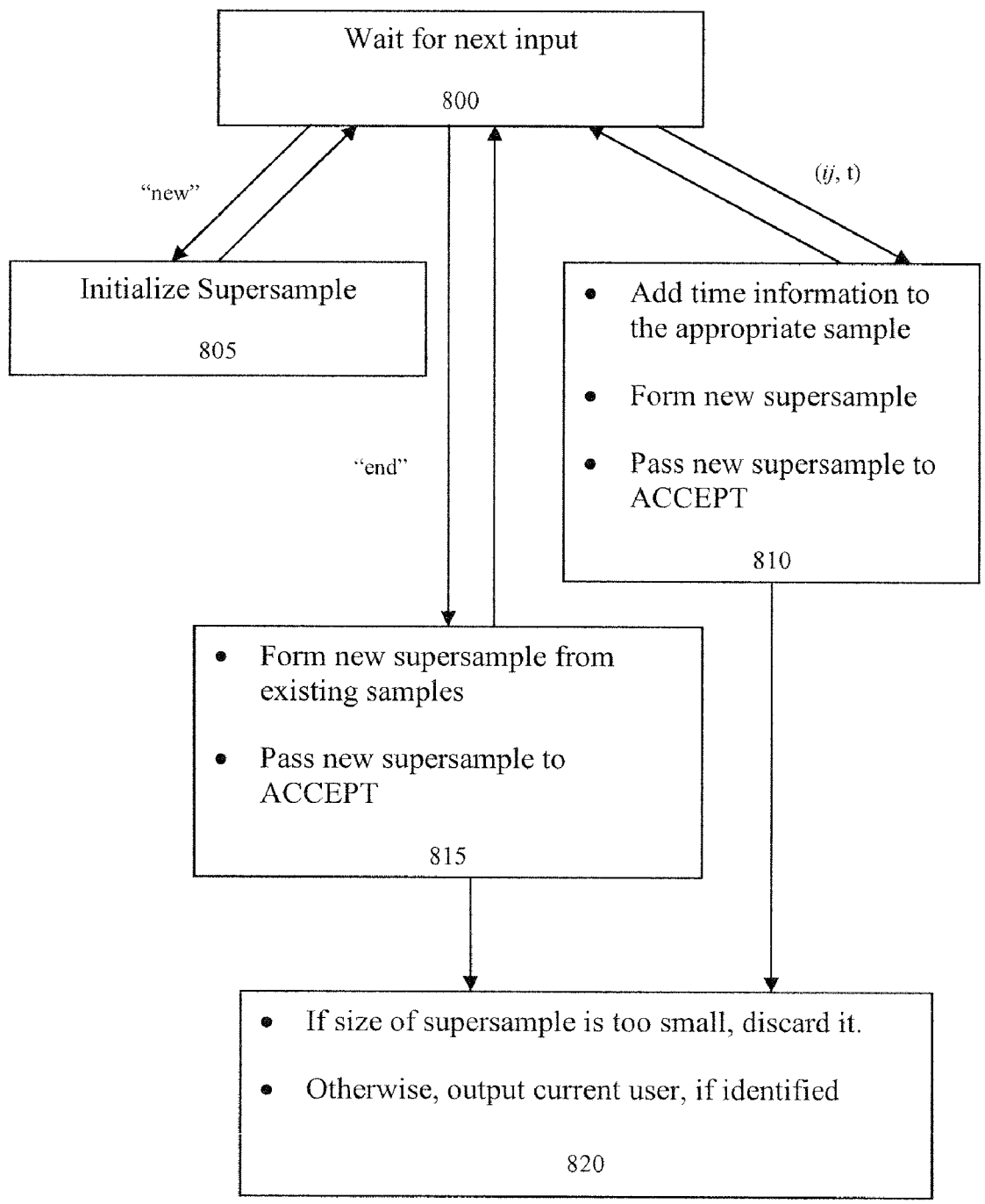
FIG. 8 illustrates the operation of a biometric identification procedure.

FIG. 8 illustrates the high-level structure of the BIOMETRIC_IDENTIFICATION procedure, and the following sample program code provides a more detailed description of its operation:

```
PROCEDURE BIOMETRIC-IDENTIFICATION
    INPUTS:
        1. Input_string: "new", "end", or "(i,j)"
        2. t: the elapsed time between typing keys i and j.
        3. ℜ: the ensemble, in the form {(Θ⁽ʳ⁾, Λ⁽ʳ⁾), 1 ≦ r ≦ L}
    OUTPUTS:
        1. r*: the index of the user, or 0 if no user identified
        2. A confidence metric to indicate certainty of identification
    SUBPROCEDURES USED:
        1. SYNTHESIZE(Θ)
        2. ACCEPT(Θ, ℜ)
    BEGIN
        1. do for_ever
            a. wait for next input
            b. if input_string = "new" then
                i. Δᵢⱼ = Ø for all i, j ∈ Γ
                ii. go to wait-state (step 1a)
            endif
```

-continued

```
        c. if input_string = "end" then
            i. Compose Θ from Δ_ij, i, j ∈ Γ
            ii. Let r* = ACCEPT(Θ, ℜ)
            iii. if r* = 0 then
                A. Unidentified user; add to set of users
                B. if identification successful, then
                    I. L := L + 1
                    II. Λ^(L) := SYNTHESIZE(Θ)
                    III. Θ^(L) := Θ
                    IV. Add (Θ^(L), Λ^(L)) to the ensemble
                    V. go to wait-state (step 1a)
                endif
            else
                C. Θ^(r*) := (1 − α)Θ^(r*) ∪ αΘ
                D. Λ^(r*) := SYNTHESIZE(Θ^(r*))
                E. Output r* as the current user
                D. go to wait-state (step 1a)
            endif
        endif
        d. if input_string = ("ij", t) then
            i. Δ_ij := Δ_ij ∪ {t}
            ii. Form the new supersample Θ
            iii. r* = ACCEPT(Θ, ℜ)
            iv. Output r*, if r* > 0 and confidence metric is
                acceptable.
            v. go to wait-state (step 1a)
        endif
    end_do
END
END PROCEDURE BIOMETRIC IDENTIFICATION
```

Procedure BIOMETRIC_IDENTIFICATION is executed on an interrupt-driven basis. It waits for the next input to arrive in step 1a 800 (in FIG. 8). When the input arrives, there is a 3-way branch based on the input string, which can take the value "new", "end", or "(i,j)" (where i, j ∈ Γ). On input of the string "new", a new supersample, containing no sample data, is created 805. On input of the string "end", a complete supersample (note that a supersample may be "complete", yet may still lack samples for specific ij pairs) is passed to the ACCEPT function, along with the ensemble 815. If the ACCEPT function returns a nonzero r*, a valid identification has been made, and the new supersample is added to the identified user's stored supersample 815. This augmentation uses exponential smoothing to discard the oldest supersample for r* and to incorporate the current supersample (step 1.c.iii.C in the program code listing above). The parameter α, where $0 < α \leq 1$, determines the amount of past data that should be retained. An appropriate value for α can be determined empirically; test data have shown that α=0.5 is a practical choice for some applications. After the stored supersample is augmented, a set of Gaussian basis functions is synthesized and added to the ensemble. If the input string is a new observation (step 1.d), then it is added to the appropriate sample $Δ_{ij}$ 810. An incremental identification is attempted by calling the ACCEPT function with the partial supersample 810. If a user is identified with an acceptable confidence metric, the user's identity is output 820. If the confidence metric is unacceptable, the current user cannot be identified as a member of the set of users. In either case, control returns to the wait-state.

The incremental identification performed in step 1.d accomplishes two things: first, if the user is identified with sufficient certainty, it enables the search system to use the past-learned behavior of this user to enhance device functionality; second, if the incremental identification produces a monotonically increasing confidence metric for the same identified user, then it further validates the biometric identification step.

The next sections provide a detailed description of the concepts involved in the two functions used above: SYNTHESIZE and ACCEPT.

Synthesis of Keystroke Biometric Signatures Using Gaussian Basis Functions

The function SYNTHESIZE that is invoked above in procedure BIOMETRIC_IDENTIFICATION takes one argument—a supersample Θ—and returns a biometric signature Λ. Since the samples $A_{ij}$ in Θ are completely independent of each other, the technique is described below using a generic sample and is invoked as many times as there are members of Θ:

```
FUNCTION SYNTHESIZE
    Inputs:
        1. Θ: a supersample
    Outputs:
        1. Λ: a synthesized biometric signature
    BEGIN
        1. Initialize:
            iteration_limit := 100;
            tolerance := 0.0001;
            K := 10;
            Λ := ∅
        2. for i ∈ Γ do
            a. for j ∈ Γ do
                i. (μ*, σ*) := OPTIMAL_GAUSSIAN_BASIS(Δ_ij,
                   iteration_limit, tolerance, K)
                ii. Λ := Λ ∪ {μ*, σ*, K}
            end_for
        end_for
    END
END SYNTHESIZE
```

Once the basis functions have been determined, the sample can be approximated by a linear combination of the basis Gaussians. The motivation for this compact representation is two-fold: (i) it is easier to perform statistical computations on a closed-form Gaussian than on a raw sample set; and (ii) the compact form is crucial in performing the Chi-Square identification scheme, described in more detail below. The basis function approach is different from the classical approaches used in current biometric identification systems and is a generalization of the current methods that use a single Gaussian approximation (e.g. the methods discussed in F. Monrose and A. D. Rubin, *Keystroke Dynamics as a Biometric for Authentication*, Future Generation Computer Systems Vol. 16, 2000, pp. 351-359, incorporated by reference herein).

The function OPTIMAL_GAUSSIAN_BASIS, called by the SYNTHESIZE function listed above, is the function that implements the technique of basis synthesis as described in the next section.

Maximum Likelihood Estimation of Gaussian Basis Functions

The maximum likelihood estimate (sometimes called the Bayesian estimate) is an estimate of the parameters that maximize the likelihood of a given sample being drawn from a known distribution with unknown parameters (i.e., the shape of the distribution is known, but not the values of parameters defining the distribution). For the set of Gaussian basis functions, the distribution is a sum of Gaussian distributions. The following notation will be used in this section: N will denote the sample size for the sample under consideration (N is the dimension of vector Y, the vector of observations). K will denote the number of Gaussian basis functions used in the estimation, and $μ_j$, $σ_j$ will denote the mean and standard deviation of the $j^{th}$ basis function, where $1 \leq j \leq K$. μ and σ are vectors (of dimension K) of the means and standard deviations of each of the K basis functions. $Y_i$ is the value of the $i^{th}$ observation $1 \leq i \leq N$. $\bar{μ}$ and $\bar{σ}$ are the mean and standard deviation of the sample, respectively. Δ denotes the sample set $\{Y_i | 1 \leq i \leq N\}$, and $f_{\mu, \sigma}$ is a function denoting the sum of Gaussian basis functions, indexed by the vectors μ and σ.

The optimization process used to estimate $\mu_j$ and $\sigma_j$ follows the traditional maximization problem:

Problem MAXIMUM_LIKELIHOOD:

$$\max_{\{\mu_j, \sigma_j\}} \sum_{1 \leq i \leq N} \ln(f_{\mu, \sigma}(Y_i)) = \quad \text{(Equation 2)}$$

$$\sum_{1 \leq i \leq N} \ln\left(\sum_{1 \leq j \leq K} \frac{1}{\sqrt{2\pi} \sigma_j} e^{-\frac{1}{2}\left(\frac{Y_i - \mu_j}{\sigma_j}\right)^2}\right)$$

Equation 2 sums the logs of the probabilities and not the probabilities themselves, but this will not affect the final result because all local maxima of a strictly positive function are also local maxima of the log of that function. Also, the MAXIMUM_LIKELIHOOD problem is subject to the following constraints:

$$\mu_j \geq 0, \sigma_j > 0, 1 \leq j \leq K \quad \text{(Equation 3)}$$

The goal is to find the set of parameters $\{\mu_j, \sigma_j\}$ that determine the K Gaussian basis functions such that the product of probabilities of the outcomes $Y_i$ is maximized.

Finding Optimal Gaussian Basis Functions

Because the MAXIMUM_LIKELIHOOD problem is NP-hard, it is not feasible to find the absolute local maximum, but it is possible to find a good approximation of a maximum for the sample by using the techniques of nonlinear programming (See D. G. Luenberger, *Linear and Nonlinear Programming*, Second Ed., Addison-Wesley, Reading Massachusetts, 1989, incorporated by reference herein). In order to measure the accuracy of the approximation given by these techniques, the sample Δ is converted into a probability distribution: let a histogram vector $h(\Delta, b, B, l, u, \bar{y})$ be a discretized probability vector representing the sample. Here, h is indexed by the original sample set Δ and five additional parameters b, B, l, u, and y, that are defined as follows:

The bucket width will be denoted by the letter b. The "lower bound", i.e. the value below which observations will not be discretized, will be denoted by the letter l, and the "upper bound" will be denoted by the letter u. The number of buckets will be denoted by an uppercase B, where $$B \triangleq \left\lfloor \frac{(u-1)}{b} \right\rfloor.$$

The total number of buckets, including underflow and overflow buckets, is B+2, indexed 0, 1, ..., B+1. Lastly, $\bar{y}$ denotes a vector of midpoints for buckets, where $\bar{y}_i$ is the midpoint of the $i^{th}$ bucket and $\bar{y}_i = l + b(i - \frac{1}{2})$; $1 \leq i \leq B$.

The histogram vector h encodes the sample in normalized, discrete buckets. All observations falling below the value 1 are assigned to bucket 0, values falling between 1 and (1+b) are assigned to bucket 1, etc. More precisely, h is defined as:

$$h_0 = \frac{|\Phi_0|}{N} \text{ where } \Phi_0 = \{Y_i \mid Y_i < 1\} \quad \text{(Equation 4)}$$

$$h_i = \frac{|\Phi_i|}{N} \text{ where}$$

$$\Phi_i = \{Y_i \mid 1 + (i-1)b \leq Y_i < 1 + ib\} 1 \leq i \leq B$$

-continued $$h_{B+1} = \frac{|\Phi_{B+1}|}{N} \text{ where } \Phi_{B+1} = \{Y_i \mid Y_i \geq u\}$$

The Residual Sum of Squares technique is used to measure the accuracy of a tentative Gaussian basis. The RSS value represents the aggregate deviation between the histogram values (the observed values) and the expected values, as predicted by the Gaussian basis functions. In general, the range of "acceptable" RSS values depends on the desired operation of the system, and can be determined empirically. Initial results suggest that RSS values between 0 and $10^{-4}$ yield Gaussian basis functions that are capable of matching the observed data with reasonable accuracy. The Residual Sum of Squares (RSS) is defined for f(μ, σ) and Δ as:

$$RSS(\Delta, f(\mu, \sigma)) = \sum_{1 \leq i \leq B} (h_i - f_{\mu, \sigma}(\bar{y}_i))^2 \quad \text{(Equation 5)}$$

The iterative optimizer ascends the gradient of the objective function and converges to a local maximum. At the local maximum, the RSS is evaluated; if the RSS is within the acceptable tolerance, the procedure terminates. Otherwise, a new iteration is started with a different initial point. The iterations continue until the acceptance threshold is satisfied or a sufficient number of local maxima are enumerated. Sample program code for the optimization algorithm is given below:

```
ALGORITHM OPTIMAL_GAUSSIAN_BASIS
    INPUTS:
        1. Δ: a sample set
        2. ε: the stopping RSS tolerance
        3. max_iter: the iteration limit
        4. K: the number of basis functions in the optimization
    OUTPUTS:
        1. (μ*, σ*): optimal parameters characterizing the Gaussian basis
           functions
    BEGIN
        1. Initialize:
            iteration counter i := 0;
            (μ*,σ*) := (-∞, -∞);
            min_rss := +∞;
        2. while ( i < max_iter and min_rss > ε) do
            a. select an initial starting solution: find a point (μ^(i,0),
               σ^(i,0)) in 2K dimensional space that is as far away as
               possible from the existing local maxima {(μ^(*,k),
               σ^(*,k)) | 0 ≤ k < i}, by solving the optimization
               problem PROBLEM_INITIAL_SOLUTION,
               described below.
            b. solve the optimization problem
               PROBLEM_MAXIMUM_LIKELIHOOD to obtain
               the local maximum solution (μ^(*,i), σ^(*,i))
            c. compute α := RSS(Δ, f(μ^(*,i), σ^(*,i)))
            d. if ( α < min_rss) then
                i. min_rss := α
                ii. (μ*,σ*) := (μ^(*,i), σ^(*,i))
               end_if
            e. i = i + 1
           end_while
    END
END ALGORITHM OPTIMAL_GAUSSIAN_BASIS
```

Finding an Initial Solution

Algorithm OPTIMAL_GAUSSIAN_BASIS finds a locally optimal solution that satisfies the RSS tolerance limit. Any iterative optimization procedure used in step 2*b* of the above algorithm requires an initial starting point that will most likely not be attracted by the local maxima already enumerated. Therefore, the starting point should be as far away as possible from the already enumerated local maxima. Since the individual Gaussian basis function parameters cannot exceed the mean $\bar{\mu}$ and standard deviation $\bar{\sigma}$ of the given sample set $\Delta$, this starting point is selected by locating the point in the hypercube bounded by the above parameters that is farthest from the existing local maxima already found. The formulation of this concept is given below as a min-max optimization problem, problem INITIAL_SOLUTION:

$$\underset{(\mu,\sigma)}{\text{Maximize}}\; z \quad \text{(Equation 6)}$$

Problem INITIAL_SOLUTION is subject to the following four constraints:

$$z \leq \|(\mu^{(*,k)}, \sigma^{(*,k)}) - (\mu, \sigma)\|^2 \quad 0 \leq \mu \leq \bar{\mu}$$

$$0 \leq k \leq K^* \quad 0 < \sigma \leq \bar{\sigma} \quad \text{(Equation 7)}$$

In the above equation, $\|\cdot\|^2$ denotes the square of the Euclidian norm, and $K^*+1$ is the number of local maxima found so far. The constraints require that z be smaller than the smallest norm. Since the objective function maximizes z, the formulation captures the min-max criterion. The constraints (Equation 7) are concave and thus the feasibility set is non-convex, resulting in a NP-hard optimization problem (See M. R. Garey, and D. S. Johnson, *Computers and Intractability: A Guide to the Theory of NP-Completeness*, W. H. Freeman and Company, New York, 1979, incorporated by reference herein). The solution to this problem can be approximated using iterated Jacobians (See Luenberger for details); this technique yields results that are sufficiently accurate for the purposes of selecting a starting point (step 2a of algorithm OPTIMAL_GAUSSIAN_BASIS).

The Benefits of a Basis-Function Approach

A set of Gaussian basis functions is generally able to fit data more closely than a single Gaussian. A particular sample representing a user's typing speeds may contain multiple peaks and valleys, and attempting to approximate such a sample with a single Gaussian will likely result in unacceptable errors. Therefore, using a set of Gaussian basis functions, as described above, produces a more accurate model of keystroke biometrics than the existing methods.

Figure 5:
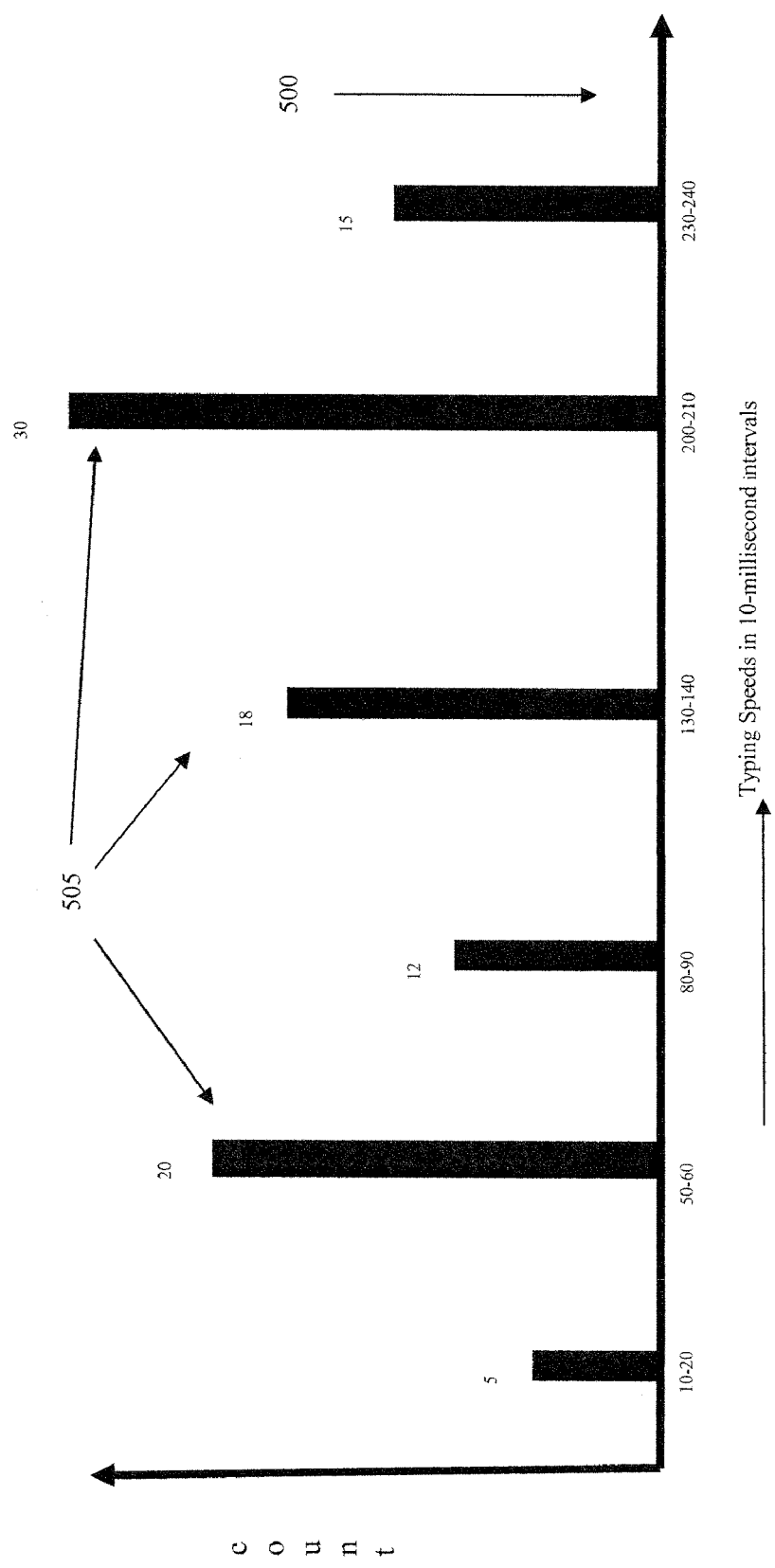
FIG. 5 illustrates an example typing speed histogram.
Figure 6:
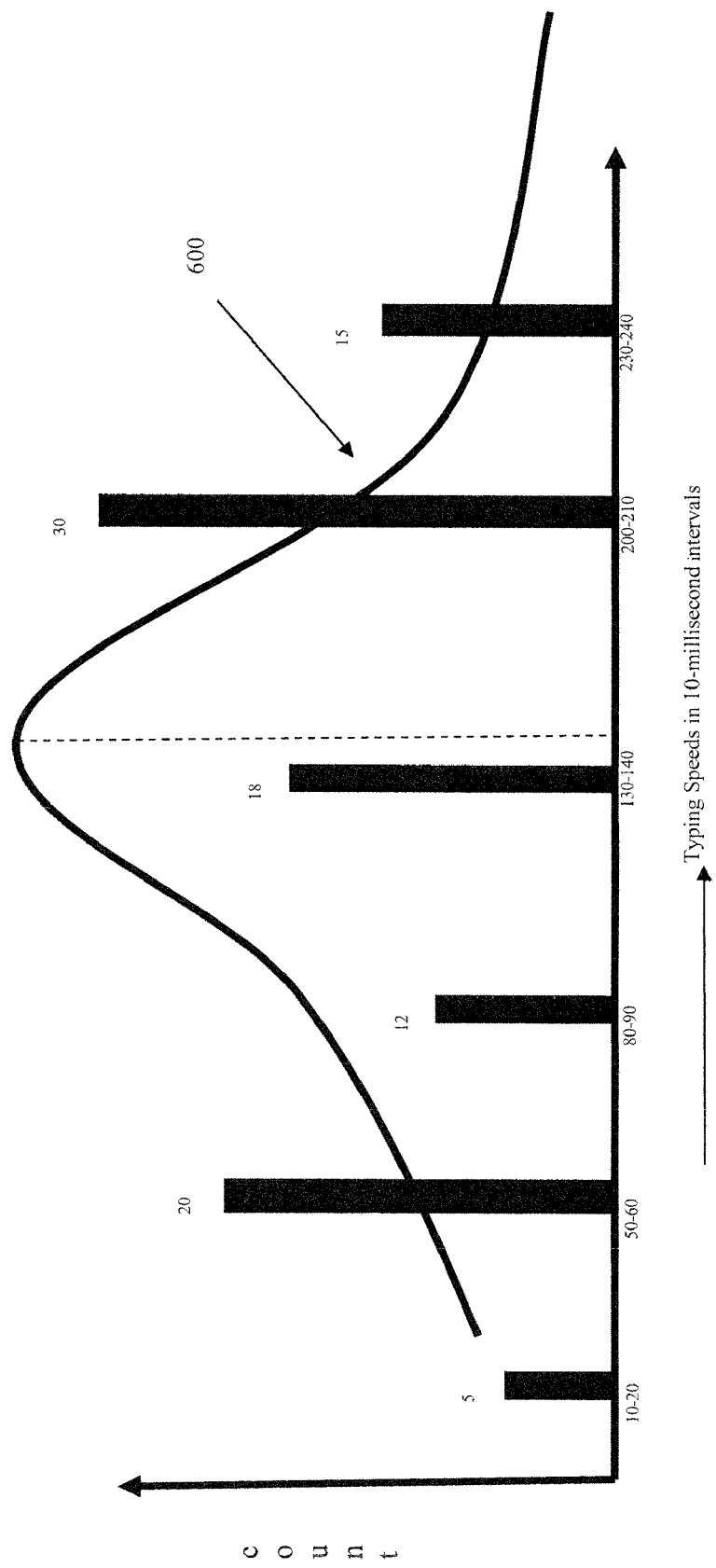
FIG. 6 illustrates a curve-fit of the histogram in FIG. 5 using a single Gaussian basis function.
Figure 7:
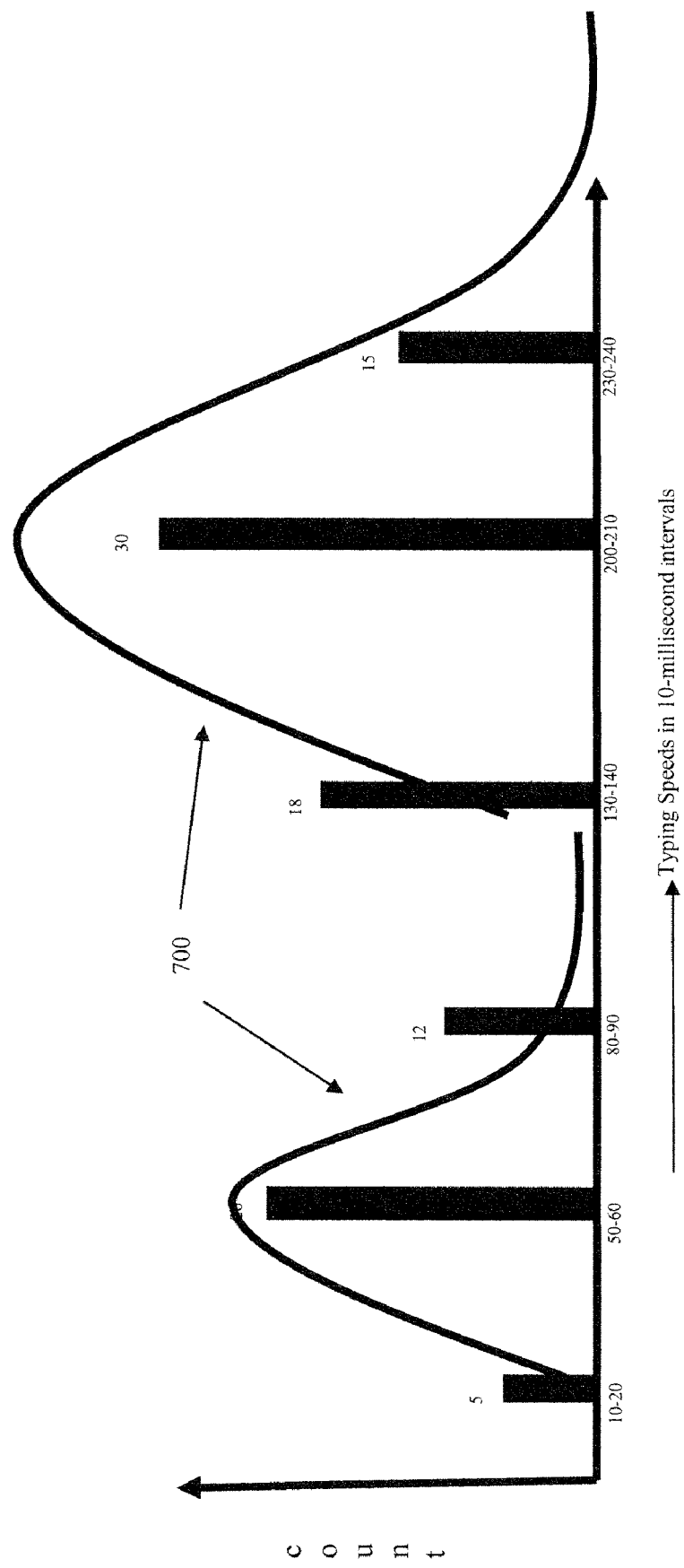
FIG. 7 illustrates a curve-fit of the histogram in FIG. 5 using two Gaussian basis functions.

FIGS. 5, 6, and 7 illustrate the advantages of using a set of Gaussians. FIG. 5 shows a histogram of a particular sample, representing the typing speed of a hypothetical user (i.e. the elapsed time between key presses for a particular pair of keys i and j). The X-axis 500 of the histogram is the typing speed in milliseconds, divided into time intervals, or buckets, of size 10 milliseconds. The height of a bar 505 represents the number of observations falling within a particular bucket. FIG. 6 shows an optimal approximation of the sample of FIG. 5 using a single Gaussian function 600. FIG. 7 shows an approximation of the sample using two Gaussian basis functions 700. It is immediately apparent that two Gaussians fit the sample better than one. This improvement can be measured by comparing the RSS values of the two solutions: the single-Gaussian approach (FIG. 4) yields an RSS of 0.194, while using two Gaussians (FIG. 5) yields an RSS of 0.07. In this case, adding an additional basis function results in an improvement of nearly 177%.

Because this method better fits the mode of the histogram, it is able to capture a more complete set of possible user behavior. For example, suppose that at some future time, the user whose data is shown in FIG. 5 exhibits a typing speed between the 10-20 and 50-60 millisecond intervals. The single-Gaussian approximation shown in FIG. 6 may not identify the user's entry as matching a known signature because that typing speed is far from the mean. However, the multiple Gaussian approximation shown in FIG. 7 would successfully identify this entry because it is within an acceptable range of one of the Gaussian basis functions. Thus, a model based on multiple Gaussians is more likely to correctly distinguish between multiple known signatures when associating a user-entry with a known signature.

The above example illustrates the benefits of using basis functions to generate compact representation of samples. Typically, a basis size of about 3 to 4 will capture most of a sample's modalities. However, the techniques described in this disclosure are able to accommodate an arbitrary number of basis functions.

Sample Identification

The Problem

One purpose of collecting keystroke biometric data is to correctly infer the identity of the person currently interacting with the system. This is only feasible if there is a repository of supersamples of all users of the system. Thus, the problem of identification can be posed as follows: Given L known supersamples, determine whether the supersample corresponding to the current user statistically matches any one of the known supersamples.

Relevant Notation $\Delta$ will denote a generic sample (the subscripts ij are omitted). L will denote the number of known samples currently in the repository. $N^{(r)}$ will denote the number of observations in the $r^{th}$ sample. $1 \leq r \leq L$. $Y_i^{(r)}$ will denote the $i^{th}$ observation of the $r^{th}$ sample; $1 \leq r \leq L$; $1 \leq i \leq N^{(r)}$. $\Omega^{(r)}$ will denote the $r^{th}$ known sample $\{Y_i^{(r)} | 1 \leq i \leq N^{(r)}\}$. $\bar{\mu}^{(r)}, \bar{\sigma}^{(r)}$ will denote the mean and standard deviation, respectively, of the $r^{th}$ sample. $h^{(r)} = (\Omega^{(r)}, b^{(r)}, B^{(r)}, 1^{(r)}, u^{(r)}, \bar{y}^{(r)})$ denotes the histogram vector and its discretization parameters for the $r^{th}$ sample. $(\mu^{*(r)}, \sigma^{*(r)}, K^{(r)})$ is a 3-tuple that will denote the optimal Gaussian basis functions for the $r^{th}$ sample. $(N, Y, \Delta, \bar{\mu}, \bar{\sigma})$ are variables denoting the current sample to be identified, and $h(\Delta, b, B, l, u, \bar{y})$ denotes the histogram vector for the sample to be identified.

Overview of First-Order Techniques

First-order techniques perform user identification using only the broad statistical properties of the current sample, such as the mean and standard deviation. Some researchers have used first-order methods with limited success (e.g. Monrose and Rubin). They tend to work well if the known ensemble has wide separation, but work poorly when two or more users have similar biometric signatures. Examples of first-order techniques include $\mu$ and $\sigma$ matching and Residual Sum of Squares:

$\mu$ and $\sigma$ Matching Method

This method matches the first two moments of the current sample with the collection of users:

$$\varepsilon = \underset{1 \leq r \leq L}{\text{Minimize}} \left( \underset{i,j \in \Gamma}{\text{Max}} \left( \text{Max} \left( \left( \frac{(\bar{\mu}_{ij} - \bar{\mu}_{ij}^{(r)})}{\bar{\mu}_{ij}^{(r)}} \right)^2, \left( \frac{(\bar{\sigma}_{ij} - \bar{\sigma}_{ij}^{(r)})}{\bar{\sigma}_{ij}^{(r)}} \right)^2 \right) \right) \right) \quad \text{(Equation 8)}$$

$$r^* = \underset{1 \leq r \leq L}{\text{Argmin}} \left( \underset{i,j \in \Gamma}{\text{Max}} \left( \text{Max} \left( \left( \frac{(\bar{\mu}_{ij} - \bar{\mu}_{ij}^{(r)})}{\bar{\mu}_{ij}^{(r)}} \right)^2, \left( \frac{(\bar{\sigma}_{ij} - \bar{\sigma}_{ij}^{(r)})}{\bar{\sigma}_{ij}^{(r)}} \right)^2 \right) \right) \right)$$

If $\epsilon$ is smaller than a predefined threshold, then a match is found and $r^*$ is the identity of the current user. Otherwise, if $\epsilon$ is larger than the threshold, then the current sample is rejected as unknown. This Min-Max criterion ensures that both moments are within acceptable bounds.

Residual Sum of Squares Method

This method uses histogram matching to identify the current sample and thus yields more accurate results than $\mu$ and $\sigma$ matching, although it is more computationally expensive. In the following, the histogram values corresponding to the pair of keys (i,j) is denoted by a superscript, e.g., $h^{(ij)}$:

$$\varepsilon = \underset{1 \leq r \leq L}{Minimize}\left(\underset{i,j \in \Gamma}{Max}\left(\sum_{1 \leq k \leq B}\left(h_k^{(ij)} - f_{\mu^*(r,ij),\sigma^*(r,ij)}(\overline{y}_k^{(ij)})\right)^2\right)\right)$$

$$r^* = \underset{1 \leq r \leq L}{Argmin}\left(\underset{i,j \in \Gamma}{Max}\left(\sum_{1 \leq k \leq B}\left(h_k^{(ij)} - f_{\mu^*(r,ij),\sigma^*(r,ij)}(\overline{y}_k^{(ij)})\right)^2\right)\right)$$

(Equation 9)

First, the sum of the squares of the difference between the sample in question and the value of the corresponding basis function at the midpoint of the sample is calculated for each bucket (except the underflow and overflow buckets) and squared. The smallest of these values, $\varepsilon$, is then compared to a threshold value; if $\varepsilon$ is lower than the threshold then the corresponding user $r^*$ is identified as the current user; otherwise there is no viable match.

While the RSS method is more refined than the $\mu$ and $\sigma$ matching method mentioned above, it requires that the current sample be discretized in precisely the same manner as the known ensemble. This may not be feasible when the sample in question is too small or is matched incrementally. However, the RSS method can be useful when used in conjunction with the Chi-Square, as discussed below.

The Chi-Square Technique

The Chi-Square technique uses probabilistic methods to identify the current sample. It is predicated on the assumption that the observations are independent, identically distributed random variables. If the underlying distribution is the same as the distribution of one of the known samples, then the Chi-Square distribution derived from these should follow the standard Chi-Square distribution.

In statistics, the Chi-Square technique has been used for hypothesis-testing of distributions, and for evaluating pseudo-random number generators (D. E. Knuth, *The Art of Computer Programming, Vol. 2, Seminumerical Algorithms*, Addison-Wesley Publishing Company, Reading, Massachusetts, 1969). One key advantage of this technique is its ability to yield accurate results for small sample sizes.

The technique will be formally described using the following notation: L, U will denote the smallest and largest values in the sample set $\Delta$. V will denote number of bins into which the interval (U-L) is divided. W will denote the bin width, where $$W = \frac{(U-L)}{V}.$$

Lastly, $p_{i,r}$ represents the probability that a random drawing from the distribution characterizing the known sample r, $f_{\mu^*(r),\sigma^*(r)}$, would fall into the ith bin.

Computing the Chi-Square statistics for each known sample involves four steps. First, the bin probabilities are calculated for each known sample r in the ensemble according to the following formula:

$$P_{i,\mu^*(r),\sigma^*(r)} = \int_{(L+(i-1)W)}^{(L+iW)} f_{\mu^*(r),\sigma^*(r)}(x)\,dx$$

(Equation 10)

Second, the algorithm calculates the number of observations contained in each bin:

$N_i=|\Psi_i|$ where $\Psi_i=\{y$ such that $y \in \Delta$ and $L+(i-1)W \leq y < L+iW\}$ $N_v=|\Psi_v|$ where $\Psi_v=\{y$ s.t. $y \in \Delta$ and $L+(V-1)W \leq y < L+VW\}$ (Equation 11)

Third, the Chi-Square statistics of the sample in question are calculated with respect to each known sample:

$$\chi^2(V, \mu^*(r), \sigma^*(r)) = \sum_{1 \leq i \leq V} \frac{(NP_{i,\mu^*(r),\sigma^*(r)} - N_i)^2}{NP_{i,\mu^*(r),\sigma^*(r)}}$$

(Equation 12)

Finally, the value of the acceptance probability $A^{(r)}$ that a standard Chi-Square distribution with V degrees of freedom can achieve the value $\chi^2_{(V,\mu^*(r),\sigma^*(r))}$ is calculated for each sample by using a distribution table (See M. Abramowitz and I. A. Stegun, *Handbook of Mathematical Functions with Formulas, Graphs, and Mathematical Tables*, Dover Publications, Inc., New York, 1970, incorporated by reference herein). The largest of these probabilities, denoted A*, is compared to a threshold value. If A* is greater than the threshold, then the corresponding sample, $r^*$, is returned as a valid match. Acceptable threshold values can be determined empirically, depending on the level of accuracy required; e.g. a value of A*=0.8 will result in a user identification whose chances of being accurate are 80%.

The ACCEPT Function

As described in the previous section, the Chi-Square approach provides more accurate results than first-order techniques in general. However, using Chi-Square statistics requires considerably more computation than the much simpler first-order techniques. It is therefore efficient to first attempt to identify the current sample using first-order techniques. If the results of this match are ambiguous, second-order techniques can be used to obtain more accurate results. This integrated approach combines the speed of first-order techniques with the accuracy of the Chi-Square method.

Figure 9:
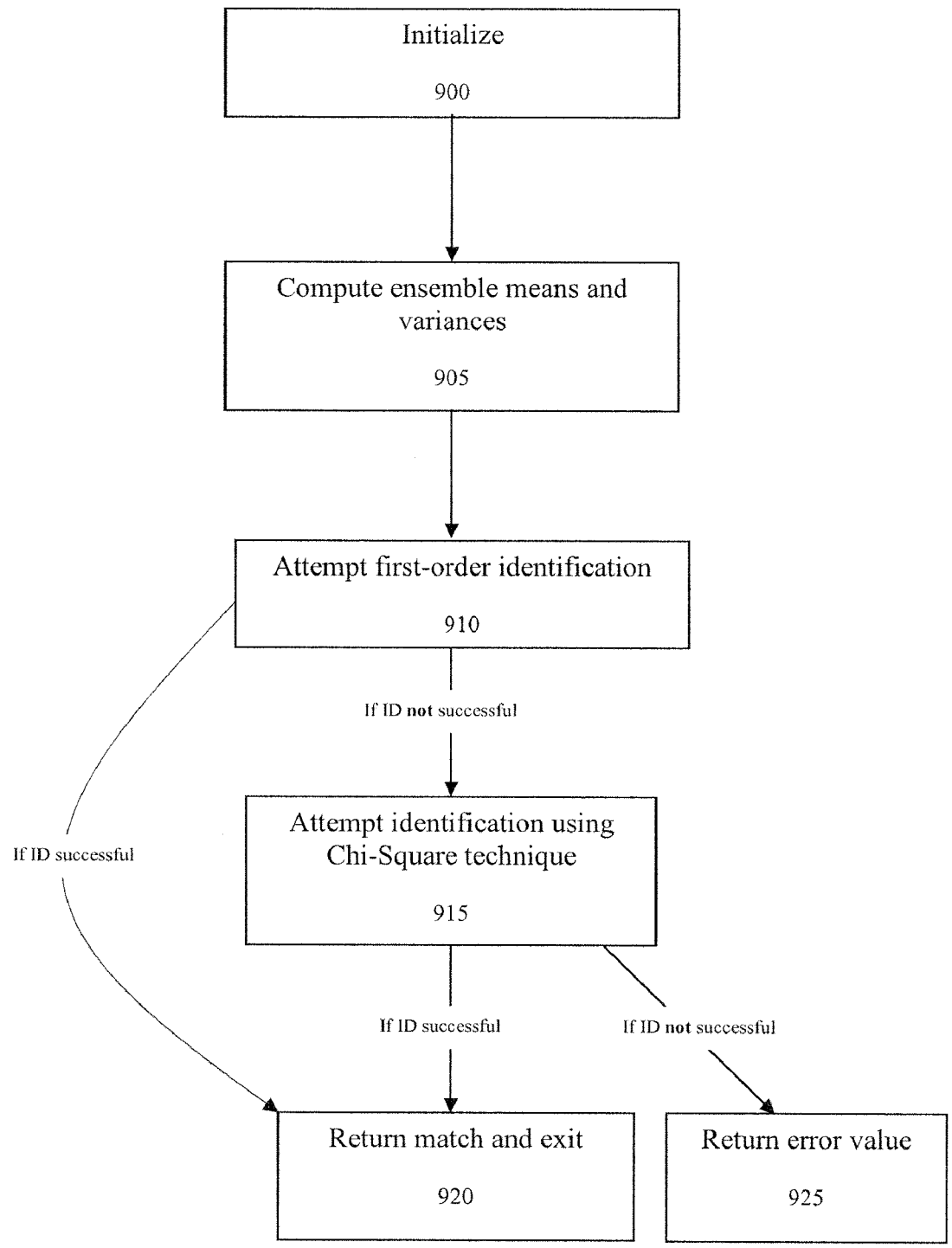
FIG. 9 illustrates the operation of a user identification procedure.

The function ACCEPT, called by procedure BIOMETRIC_IDENTIFICATION, combines first- and second-order techniques to provide an integrated algorithm for identification. FIG. 9 illustrates the high-level structure of the ACCEPT function, and the following sample program code provides a more detailed description of its operation:

```
FUNCTION ACCEPT
Inputs:
    1. Θ: a supersample, containing samples Δ_ij to be identified
    2. |ℜ|: the known ensemble
    3. β: the acceptance threshold for Chi-Square statistics
    4. tolerance: the residue error tolerance, for first order methods
Outputs:
    1. r*: the identity of the user, or 0 if the supersample is not
       identifiable
    2. α: a confidence metric, 0 ≤ α ≤ 1
BEGIN
    1. Initialize:
        ε:= ∞;
        L = |ℜ|
```

-continued

2. Compute ensemble means and variances:
   For $1 \leq r \leq L$ do
     a. For $i \in \Gamma$ and $j \in \Gamma$ do i. $N := |\Delta_{ij}^{(r)}|$ ii. if $N = 0$, set $\bar{\mu}_{ij}^{(r)} := \bar{\sigma}_{ij}^{(r)} := 0$; continue iii. $\bar{\mu}_{ij}^{(r)} := \frac{1}{N} \sum_{1 \leq k \leq N} \Delta_{ij}^{(r)}(k)$ iv. $\bar{\sigma}_{ij}^{(r)} := \sqrt{\frac{1}{(N-1)} \sum_{1 \leq k \leq N} (\Delta_{ij}^{(r)}(k) - \bar{\mu}_{ij}^{(r)})^2}$ end_for
   end_for
3. Attempt first-order identification:
   For $1 \leq r \leq L$ do
     a. max sample_error := 0
     b. For $i \in \Gamma$ and $j \in \Gamma$ do i. $N := |\Delta_{ij}|$ ii. if $N = 0$, continue iii. $\bar{\mu}_{ij} := \frac{1}{N} \sum_{1 \leq k \leq N} \Delta_{ij}(k)$ iv. $\bar{\sigma}_{ij} := \sqrt{\frac{1}{(N-1)} \sum_{1 \leq k \leq N} (\Delta_{ij}(k) - \bar{\mu}_{ij})^2}$ v. $\alpha := \text{Max}\left(\left(\frac{\bar{\mu}_{ij} - \bar{\mu}_{ij}^{(r)}}{\bar{\mu}_{ij}^{(r)}}\right)^2, \left(\frac{\bar{\sigma}_{ij} - \bar{\sigma}_{ij}^{(r)}}{\bar{\sigma}_{ij}^{(r)}}\right)^2\right)$ vi. If $\alpha >$ max_sample_error, max_sample_error := $\alpha$ end_for
     c. if max_sample error < tolerance then
        i. $\epsilon$ := max_sample_error
        ii. best_match := r
        end if
   end_for
4. If a first-order match is found, return it and exit:
   If $\epsilon \leq$ tolerance then
     a. set confidence_metric := $1 - \epsilon$
     b. return best_match and confidence_metric
   end_if
5. Initialize best_acceptance := 0
6. If first-order results are ambiguous, use Chi-Square technique:
   For $1 \leq r \leq L$ do
     a. Initialize min_acceptance_prob = $\infty$
     b. For $i \in \Gamma$ and $j \in \Gamma$ do
        i. Compute the Chi-Square statistic $\chi^2(V, \mu^*(r), \sigma^*(r))$
        ii. Compute the acceptance probability $A_{ij}^{(r)}$
        iii. If min_acceptance_prob > $A_{ij}^{(r)}$ then
             min_acceptance_prob = $A_{ij}^{(r)}$
             end_if
        end_for
     c. if min_acceptance_prob > best_acceptance then
        i. best_acceptance := min_acceptance_prob
        ii. best_match := r
        end_if
   end_for
7. If best_acceptance >= $\beta$ then
     a. confidence_metric := best_acceptance
     b. return confidence_metric and best_match
   end_for
END
END FUNCTION ACCEPT After the initialization phase 900 (in FIG. 9), the ACCEPT function computes the means and variances of the ensemble 905, and uses these values to attempt first-order user identification 910. If the first-order techniques are successful, the identity of the current user is returned 920. Otherwise, the ACCEPT function attempts to infer the identity of the current user by means of second-order techniques, which are computationally intensive but more accurate 915. If the second-order techniques result in an accurate identification, the identity of the current user is returned 920. Otherwise, the ACCEPT function returns an error value, indicating that the current user cannot be identified as a member of the set of users 925.

One implementation of the present invention uses Gaussian basis functions and second-order statistical techniques to quickly and accurately infer the identity of the current user of an electronic device based on keystroke inputs. The timing of the current user's keystrokes is recorded, and for each pair of keys on the device, a signature is generated to encode the timing information associated with the key pairs. The signature captures peaks in the distribution of times between keystrokes for the key pairs. Using more than one peak in the distribution, in contrast to a single mean and deviation, leads to more reliable user identification, because a collection of peaks is able to model complex timing information more accurately than a single-peak approach.

After a set of signatures for multiple key pairs has been generated for the current user, the collected set is compared to the sets of signatures of the collection of users of the device, which are stored in a database. If the current set of signatures is sufficiently similar to one of the sets of known signatures, the system returns the identity of the closest matching user. If the system is unable to find a sufficiently close match, a new set of signatures is added to the database. Initially, the matching process uses first-order techniques to find a reliable match. If a reliable match is not found using first-order techniques, second-order techniques (e.g. the Chi-Square technique) are used. First-order techniques have the advantage of being computationally faster than second-order techniques. Meanwhile, second-order techniques can distinguish between sets of signatures that have similar first-order statistics.

This process of user identification has a wide range of potential uses. In one illustrative implementation, an audio/video content system has using the techniques to improve the user's experience. The content system has a collection of content that is searchable by text input. The collection of content has associated metadata that characterizes the information of each content items. Thus, a user can enter a text query to identify content items in which he or she is interested.

Using the techniques described above, the system can infer an identity of which one of a relatively small collection of users is entering queries for content items. The system can then track and maintain a set of the content preferences for each of the users based on what each user selects from the search results. The system can associate each user's viewing preferences with each user's biometric signature. Thus, at a later time, upon inferring the identity of which user of the collection of users is entering a query to search for content items, the identified user's preferences are used to boost the relevance of content items that match that particular user's preferences. Similarly targeted advertising or content recommendations can be displayed to the user for items that match the identified user's preferences or inferred interests based on the user's preferences.

It will be appreciated that the scope of the present invention is not limited to the above-described embodiments, but rather is defined by the appended claims, and these claims will encompass modifications of and improvements to what has been described. For example, embodiments have been described in terms of inferring the identity of a user of a device that has a telephone-style keypad. However, embodiments of the invention can be implemented on devices having any number of keys, and on which each key corresponds to any number of functions.

Moreover, the techniques described above can be applied not only to the timing of pairs of keystrokes but also to other biometric measures. For example, the identity of a user may be inferred based on the amount of time keys are depressed before they are released, the amount of pressure the user applies to keys when typing, or by analyzing the variability of the user's typing speed as a function of time. Also, as mentioned above, a user's preferred typing method (e.g., "V-tap", "T-tap", etc.) can be used as a factor in the identification process. Thus, while the description above focuses on inferring the identity of a user based on the delay between keystrokes, any of the ways in which users interact with an input device can serve as a source of biometric data.

For example, the techniques apply equally to biometrics such as the angle at which an infrared beam emitted by a remote control makes contact with the infrared receiver (the angle being related to the height of a user and/or the manner in which the user holds the remote control device). Similarly, the specific identity of which keys are pressed, independent or in combination with the keystroke timing measurement, can serve as a basis for inferring which user is interacting with the system, as some users may prefer certain functions over others. Thus, function keys that control how content items are presented, or how a list of content item search results are reviewed, can provide information useful for inferring which user is interacting with the system.

What is claimed is:

1. A user-interface method of selecting and presenting a collection of content items in which the presentation is ordered at least in part based on inferring which user of a relatively small collection of users is using an input device, the method comprising:
providing a set of content items;
providing a set of preference information for each user of the collection of users, each set of preference information indicating content item preferences of a corresponding user;
providing a set of user keypress biometric models, each model representing expected keypress activity for the corresponding user;
receiving incremental input entered by a user for incrementally identifying desired content items, the incremental input corresponding to a sequence of keys pressed by the user on the input device;
in response to the incremental input entered by the user, monitoring and characterizing keypress activity to biometrically characterize the user, the monitoring and characterizing keypress activity including using a linear combination of at least two statistical distributions to characterize the keypress activity;
analyzing the keypress activity to find the closest match to one of the keypress biometric models;
using the closest match to infer which user of the collection of users entered the incremental input;
selecting preference information corresponding to the inferred user;
in response to selecting the preference information and the incremental input entered by the user, selecting and presenting a collection of content items in an order that portrays as relatively more relevant those content items that more closely match the set of preferences of the inferred user.

2. The method of claim 1,
wherein each user keypress biometric model at least represents an expected delay between key presses for ordered keypress pairs for the corresponding user;
wherein the monitoring and characterizing keypress activity includes determining the amount of time between successive key presses and associating times between key presses and the corresponding ordered keypress pairs; and
wherein the analyzing the keypress activity includes analyzing the determined times and associated ordered keypress pairs to find the closest match to one of the keypress biometric models.

3. The method of claim 2, wherein the ordered keypress pairs include a plurality of unique pairings of keys of the input device.

4. The method of claim 2, wherein the expected delay between key presses for ordered keypress pairs is represented by a set of expected delays for each keypress pair.

5. The method of claim 2, wherein the expected delay between key presses for ordered keypress pairs is represented by at least one discrete range.

6. The method of claim 1, wherein the analyzing the keypress activity to find the closest match includes at least one of a first-order statistical comparison of the keypress activity and the set of user keypress biometric models and a second-order statistical comparison of the keypress activity and the set of user keypress biometric models.

7. The method of claim 6, wherein the analyzing the keypress activity to find the closest match includes a Chi-Square statistical comparison of the keypress activity and the set of user keypress biometric models.

8. The method of claim 1, wherein the incremental input includes ambiguous text.

9. The method of claim 1, wherein the input device is at least one of an input-constrained and a display-constrained device.

10. The method of claim 9, wherein the input device is at least one of a television remote control system, a telephone, a PDA, and a handheld personal computing device.

11. The method of claim 1, wherein the content items include at least one of audio/video content, address book information, electronic documents, and a collection of words.

12. The method of claim 1,
wherein each user keypress biometric model at least represents an expected amount of time that a key is depressed for the corresponding user;
wherein the monitoring and characterizing keypress activity includes determining the amount of time a key is depressed and associating the times and the corresponding keys; and
wherein the analyzing the keypress activity includes analyzing the determined times and associated keys to find the closest match to one of the keypress biometric models.

13. The method of claim 1,
wherein the input device includes more than one input mode controlling how incremental input is entered;
wherein each user keypress biometric model at least represents a preferred input mode for the corresponding user;
wherein the monitoring and characterizing keypress activity includes determining the input mode selected by the user; and wherein the analyzing the keypress activity includes analyzing the input mode selected by the user to find the closest match to one of the keypress biometric models.

14. The method of claim 1,
wherein each user keypress biometric model at least represents an expected amount of pressure applied to a key when depressed for the corresponding user;
wherein the monitoring and characterizing keypress activity includes determining the amount of pressure applied to a key when depressed and associating the pressures and the corresponding keys; and
wherein the analyzing the keypress activity includes analyzing the determined pressures and associated keys to find the closest match to one of the keypress biometric models.

15. The method of claim 1,
wherein the input device includes a plurality of function keys controlling how content items are presented;
wherein each user keypress biometric model at least represents preferred function keys for the corresponding user;
wherein the monitoring and characterizing keypress activity includes determining the function keys pressed by the user; and
wherein the analyzing the keypress activity includes analyzing the determined function keys pressed to find the closest match to one of the keypress biometric models.

16. A user-interface system for selecting and presenting a collection of content items in which the presentation is ordered at least in part based on inferring which user of a relatively small collection of users is using an input device, the system comprising:
a catalog of a set of content items;
a set of preference information for each user of the collection of users, each set of preference information indicating content item preferences of a corresponding user;
a set of user keypress biometric models, each model representing expected keypress activity for the corresponding user;
input logic for receiving incremental input entered by a user for incrementally identifying desired content items, the incremental input corresponding to a sequence of keys pressed by the user on the input device;
monitoring logic responsive to the incremental input entered by the user for monitoring and characterizing keypress activity to biometrically characterize the user, the monitoring and characterizing keypress activity including using a linear combination of at least two statistical distributions to characterize the keypress activity;
analyzing logic for analyzing the keypress activity to find the closest match to one of the keypress biometric models;
inferring logic for using the closest match to infer which user of the collection of users entered the incremental input;
selection logic for selecting preference information corresponding to the inferred user;
search logic responsive to selecting the preference information and the incremental input entered by the user, selecting and presenting a collection of content items in an order that portrays as relatively more relevant those content items that more closely match the set of preferences of the inferred user.

17. The system of claim 16,
wherein each user keypress biometric model at least represents an expected delay between key presses for ordered keypress pairs for the corresponding user;
wherein the monitoring logic includes logic for determining the amount of time between successive key presses and associating times between key presses and the corresponding ordered keypress pairs; and
wherein the analyzing logic includes logic for analyzing the determined times and associated ordered keypress pairs to find the closest match to one of the keypress biometric models.

18. The system of claim 17, wherein the ordered keypress pairs include a plurality of unique pairings of keys of the input device.

19. The system of claim 17, wherein the expected delay between key presses for ordered keypress pairs is represented by a set of expected delays for each keypress pair.

20. The system of claim 17, wherein the expected delay between key presses for ordered keypress pairs is represented by at least one discrete range.

21. The system of claim 16, wherein the analyzing logic includes logic to perform at least one of a first-order statistical comparison of the keypress activity and the set of user keypress biometric models and a second-order statistical comparison of the keypress activity and the set of user keypress biometric models.

22. The system of claim 21, wherein the analyzing logic includes logic to perform a Chi-Square statistical comparison of the keypress activity and the set of user keypress biometric models.

23. The system of claim 16, wherein the incremental input includes ambiguous text.

24. The method of claim 1, wherein the input device is at least one of an input-constrained and a display-constrained device.

25. The system of claim 24, wherein the input device is at least one of a television remote control system, a telephone, a PDA, and a handheld personal computing device.

26. The system of claim 16, wherein the content items include at least one of audio/video content, address book information, electronic documents, and a collection of words.

27. The system of claim 16,
wherein each user keypress biometric model at least represents an expected amount of time that a key is depressed for the corresponding user;
wherein the monitoring logic includes logic for determining the amount of time a key is depressed and associating the times and the corresponding keys; and
wherein the analyzing logic includes logic for analyzing the determined times and associated keys to find the closest match to one of the keypress biometric models.

28. The system of claim 16,
wherein the input device includes more than one input mode controlling how incremental input is entered;
wherein each user keypress biometric model at least represents a preferred input mode for the corresponding user;
wherein the monitoring logic includes logic for determining the input mode selected by the user; and
wherein the analyzing logic includes logic for analyzing the input mode selected by the user to find the closest match to one of the keypress biometric models.

29. The system of claim 16,
wherein each user keypress biometric model at least represents an expected amount of pressure applied to a key when depressed for the corresponding user;

wherein the monitoring logic includes logic for determining the amount of pressure applied to a key when depressed and associating the pressures and the corresponding keys; and wherein the analyzing logic includes logic for analyzing the determined pressures and associated keys to find the closest match to one of the keypress biometric models.

30. The system of claim 16, wherein the input device includes a plurality of function keys controlling how content items are presented;

wherein each user keypress biometric model at least represents preferred function keys for the corresponding user;

wherein the monitoring logic includes logic for determining the function keys pressed by the user; and wherein the analyzing logic includes logic for analyzing the determined function keys pressed to find the closest match to one of the keypress biometric models.

31. The method of claim 1, further comprising providing a set of user expected angle models, each model representing an expected angle at which an infrared beam emitted by the input device makes contact with an infrared receiver for the corresponding user, the expected angle being related to the manner in which the user holds the input device while entering the incremental input;

wherein the monitoring and characterizing keypress activity includes estimating the angle at which the infrared beam emitted by the input device makes contact with the infrared receiver; and wherein the analyzing the keypress activity includes analyzing the estimated angle at which the infrared beam emitted by the input device makes contact with the infrared receiver to find the closest match to one of the expected angle models.

32. The system of claim 16, further comprising a set of user expected angle models, each user expected angle model representing an expected angle at which an infrared beam emitted by the input device makes contact with an infrared receiver for the corresponding user, the expected angle being related to the height of the user or the manner in which the user holds the input device;

wherein the monitoring logic includes logic for determining the angle at which the infrared beam emitted by the input device makes contact with the infrared receiver; and wherein the analyzing logic includes logic for analyzing the determined angle at which the infrared beam emitted by the input device makes contact with the infrared receiver to find the closest match to one of the expected angle models.

* * * * *